United States Patent
Davis et al.

(10) Patent No.: US 7,774,322 B2
(45) Date of Patent: *Aug. 10, 2010

(54) FILE TRANSFER ERROR HANDLING

(75) Inventors: Christopher S. Davis, Issaquah, WA (US); David R. Johnson, Woodinville, WA (US); Robert F. Day, Bellevue, WA (US); Stephan Hoefnagels, Seattle, WA (US); Timothy P. McKee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 675 days.

This patent is subject to a terminal disclaimer.

(21) Appl. No.: 11/136,522

(22) Filed: May 25, 2005

(65) Prior Publication Data

US 2006/0271602 A1    Nov. 30, 2006

(51) Int. Cl.
*G06F 17/30* (2006.01)
(52) U.S. Cl. .................. 707/691; 707/821
(58) Field of Classification Search .............. 707/200, 707/205, 1–6, 10, 202; 714/100, 6, 46, 48, 714/764, 799
See application file for complete search history.

(56) References Cited

U.S. PATENT DOCUMENTS

| | | | |
|---|---|---|---|
| 6,345,318 B1 | 2/2002 | Gamon | |
| 6,360,246 B1 | 3/2002 | Begley et al. | |
| 6,625,334 B1* | 9/2003 | Shiota et al. | 382/305 |
| 6,687,846 B1* | 2/2004 | Adrangi et al. | 714/4 |
| 7,099,869 B1* | 8/2006 | Forstall et al. | 707/10 |
| 7,143,114 B2* | 11/2006 | Cazier | 707/200 |
| 2002/0093582 A1* | 7/2002 | Aoki et al. | 348/333.02 |
| 2003/0051191 A1 | 3/2003 | Circenis et al. | |
| 2003/0097617 A1 | 5/2003 | Goeller et al. | |
| 2004/0105018 A1 | 6/2004 | Takahashi et al. | |
| 2004/0133589 A1 | 7/2004 | Kiessig et al. | |
| 2004/0193956 A1 | 9/2004 | Greenlee et al. | |
| 2004/0199832 A1* | 10/2004 | Powers et al. | 714/48 |
| 2005/0102567 A1 | 5/2005 | McGuire et al. | |
| 2005/0246612 A1 | 11/2005 | Leis et al. | |
| 2005/0278569 A1 | 12/2005 | Srinivasan et al. | |
| 2006/0161811 A1* | 7/2006 | Welts | 714/15 |
| 2006/0259160 A1* | 11/2006 | Hood et al. | 700/20 |

OTHER PUBLICATIONS

Acdsee™7, The photo manager that sets you free—User Guide, 2004.

* cited by examiner

*Primary Examiner*—Cam-Linh Nguyen
(74) *Attorney, Agent, or Firm*—Shook, Hardy & Bacon L.L.P.

(57) ABSTRACT

A file operations engine is provided that manages many user interactions with their files via a computer system. The operation engine may provide a user with the option to keep both files that have a file name conflict. It may further permit the user to rename a file involved with a file name conflict. The operations engine may also automatically rename one of the files of a file name conflict by appending a character to a root of the filename. The character may include the lowest integer available for the root in a destination for the files. The operations engine may provide the option to keep both files as part of a pre-calculation of potential errors for a requested operation. The operations engine may place file name conflicts in an error queue and permit the user to select an option to keep both files after the conflict is encountered.

19 Claims, 27 Drawing Sheets

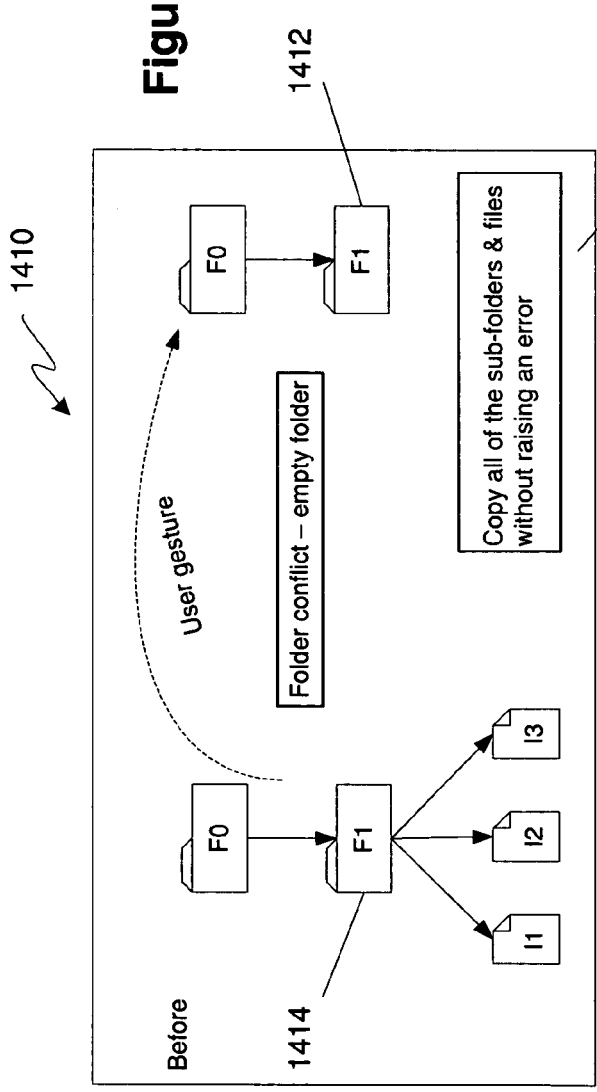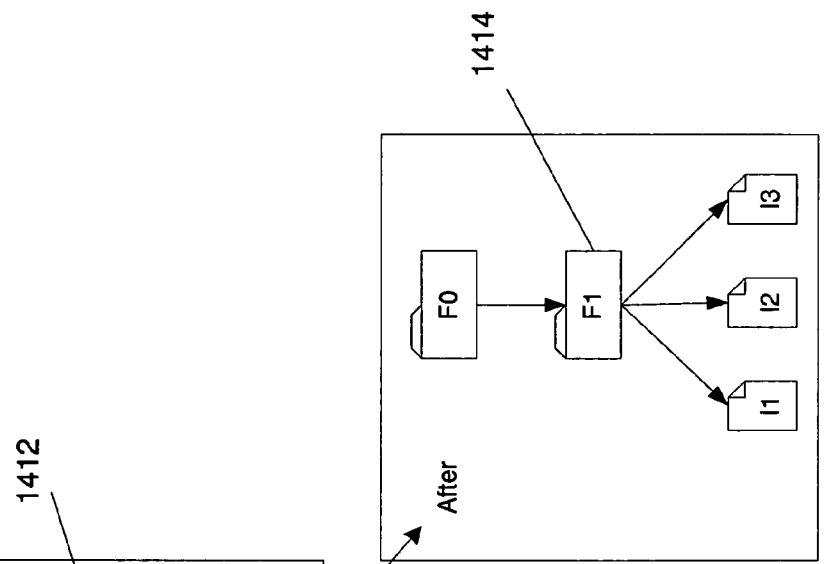
Figure 14A
Figure 14B

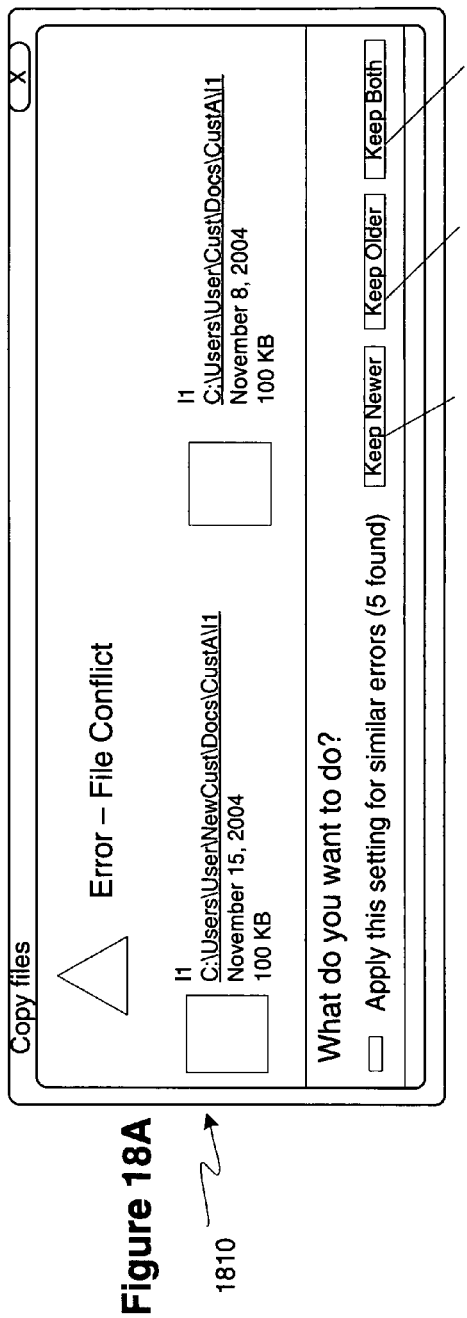
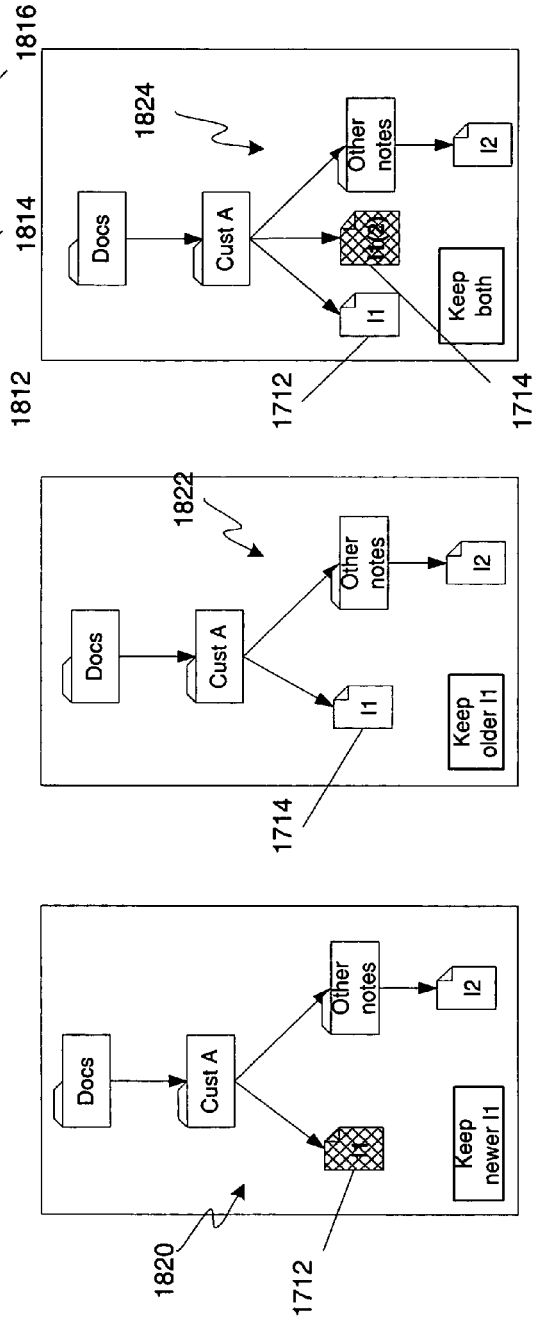

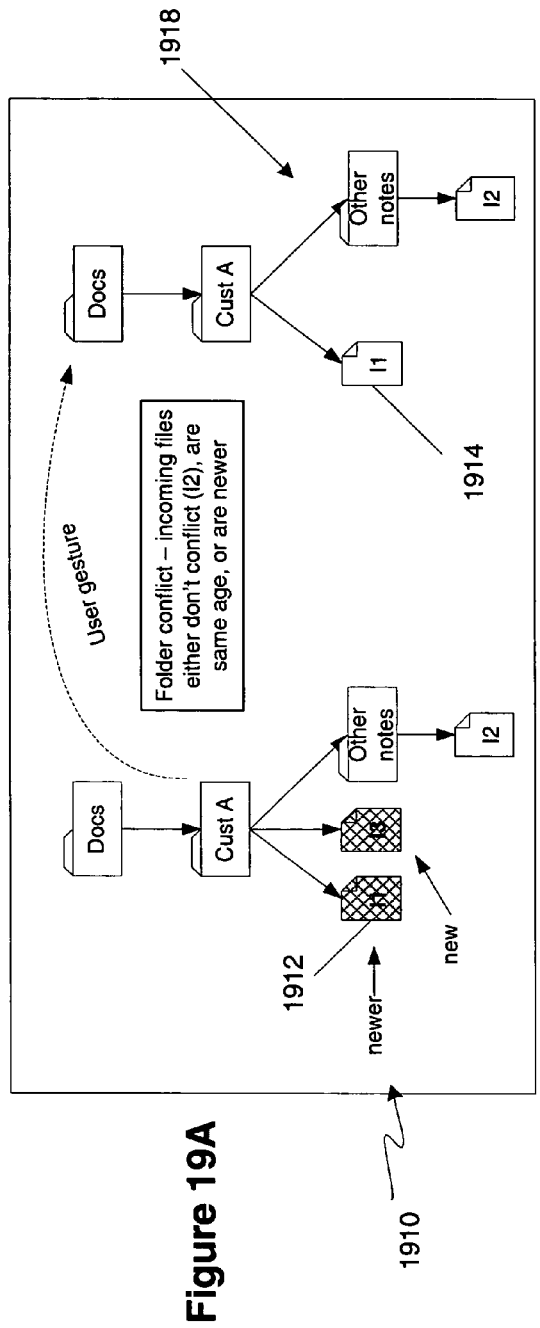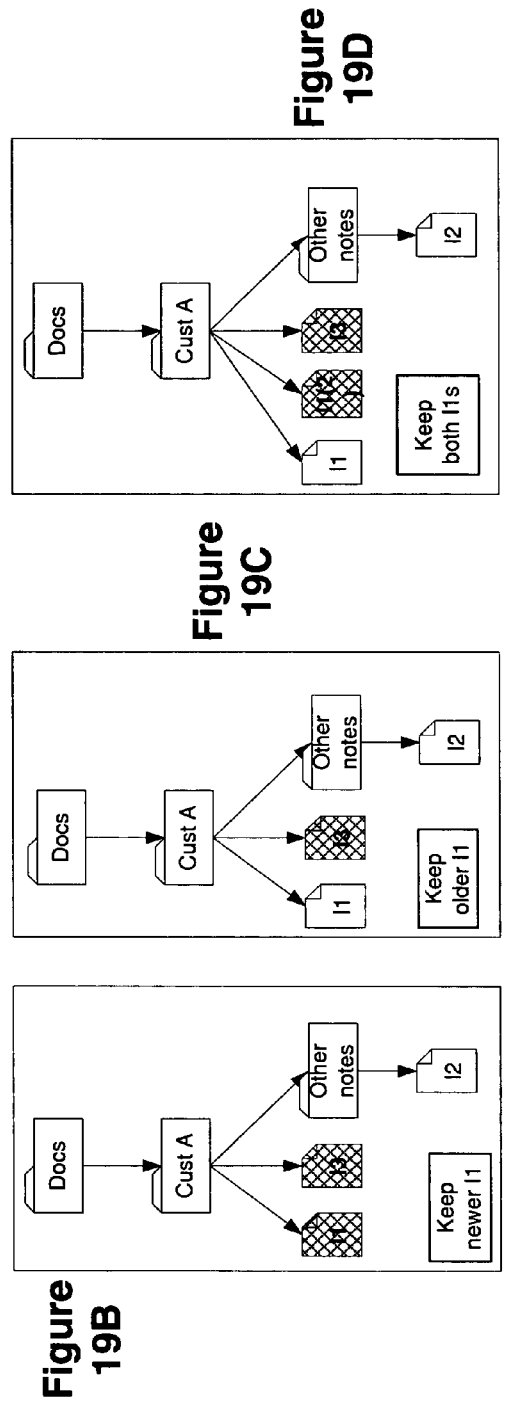

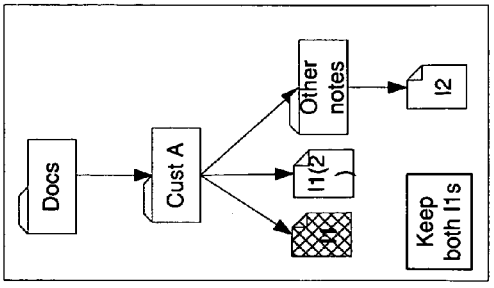
Figure 20D
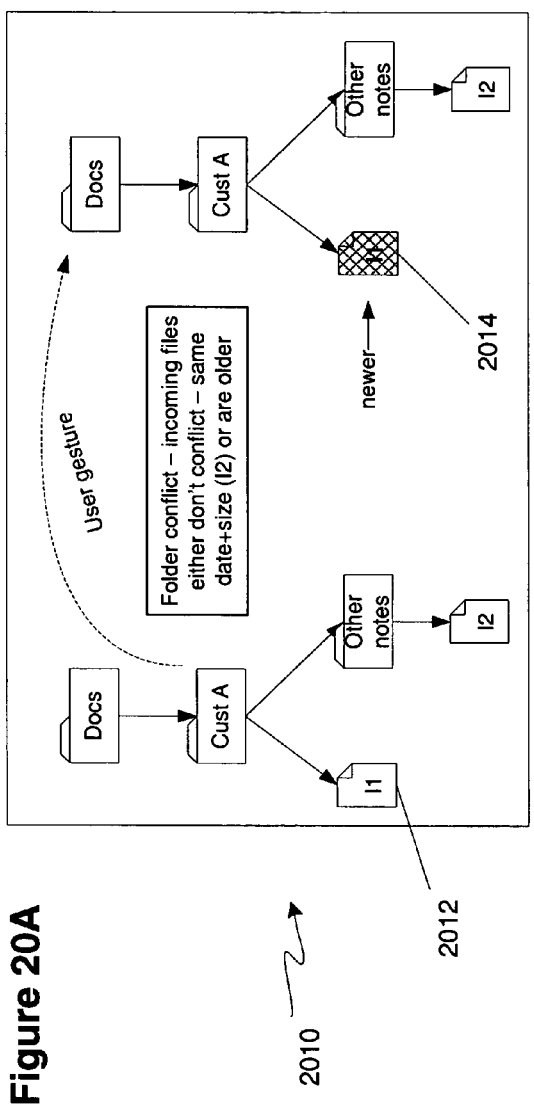
Figure 20A
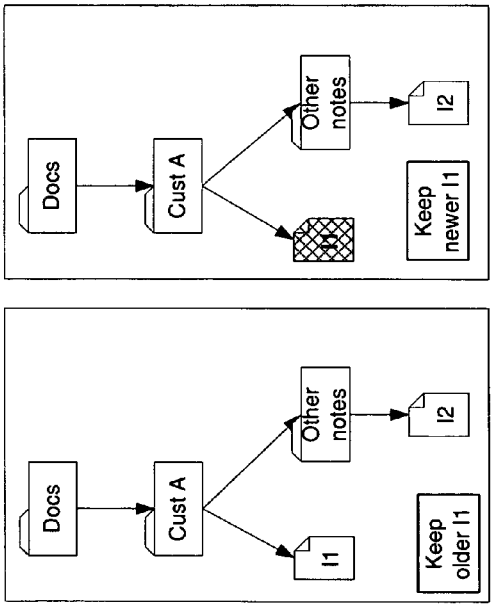
Figure 20B
Figure 20C

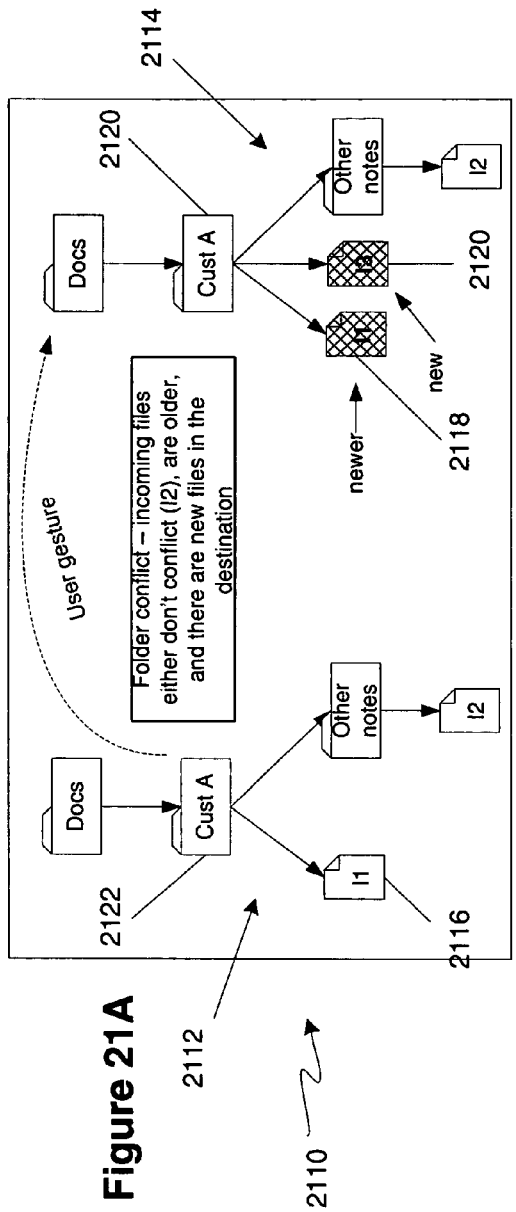
Figure 21A
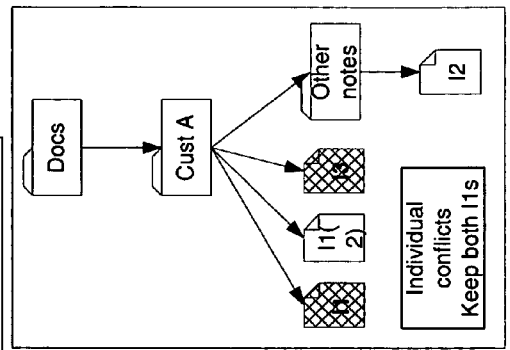
Figure 21E
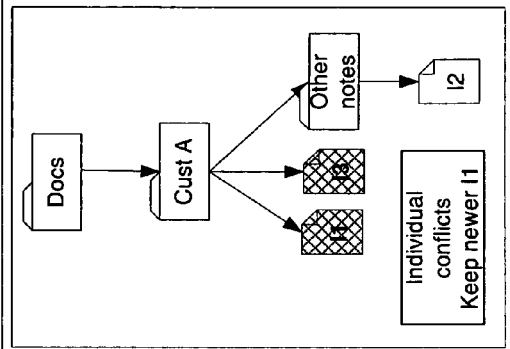
Figure 21D
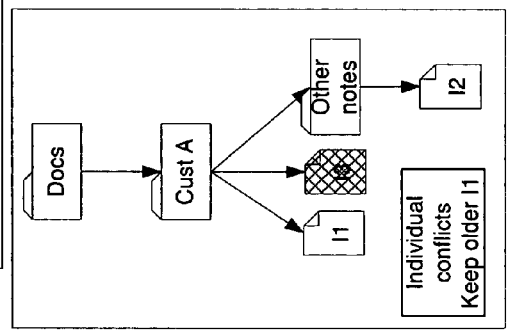
Figure 21C
Figure 21B

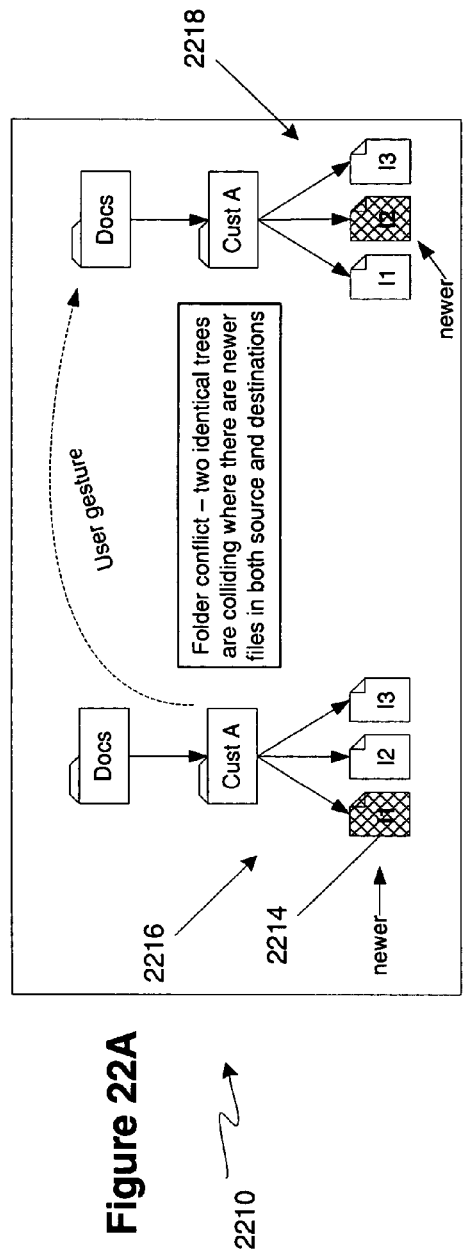
Figure 22A
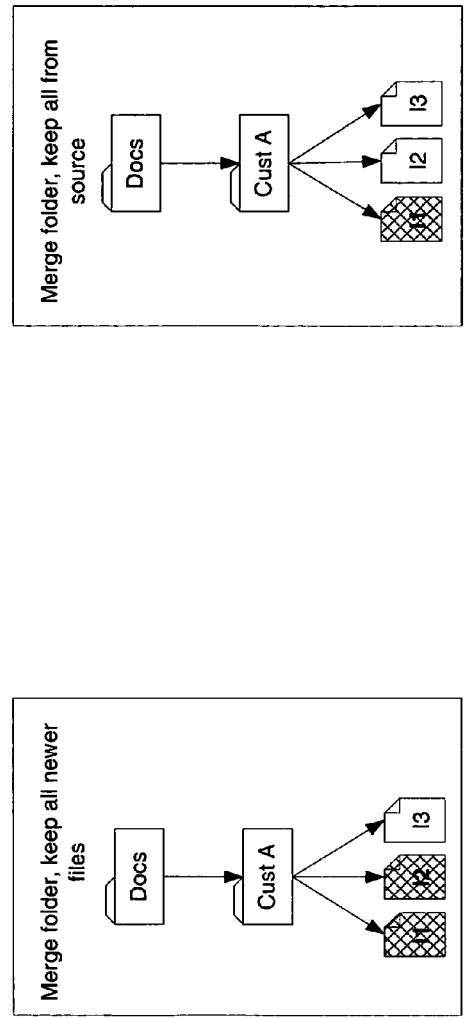
Figure 22B
Figure 22C

FILE TRANSFER ERROR HANDLING

FIELD OF THE INVENTION

The invention relates generally to error handling for computer systems. More specifically, the invention relates to error handling during file handling operations, to user interfaces related to the same, and to related methods and software.

BACKGROUND OF THE INVENTION

Computer users interact with computer files through a copy engine, which is part of the operating system shell of the computer. The shell copy engine generates user interface (UI) dialogs, such as a progress UI dialog that illustrates progress of a copy operation and error dialogs that indicate conflict or permission errors. As used herein, a "dialog" includes a window, a message box, or another portion of a graphical computer display which appears in order to communicate information from a computer program and/or to obtain information from the user. Familiar examples are progress dialogs and error dialogs used in various versions of the WINDOWS operating system (available from Microsoft Corporation of Redmond, Wash.).

A dialog often contains a brief message (e.g., "The folder already contains a file named "examplefile;" or "Would you like to replace the existing file with this one?") and one or more graphical buttons for possible user responses (e.g., "yes," "no," etc.).

Conventional copy engines manage the copying, moving and deleting of individual files or collections of files. These engines delete files by flagging them for removal, such as by placing them in a 'recycle bin,' 'trash can' or other temporary folder. They operate in a serial manner to perform a given operation in sequential order. When conventional copy engines encounter an error during an operation, they stop processing the operation and display a dialog for the error that requires user input.

Processing continues after the user provides instructions for handling the error. This can be frustrating for a user. For instance, in a multi-hour copy operation, the error can occur 10 minutes into the operation after the user has already left the machine; the user will return several hours later expecting the process to be done (e.g., copying large files to a laptop for a trip) and find that only 10 minutes of processing has been completed.

Conventional copy engines typically begin processing a requested operation, such as a copy operation, without verifying sufficient storage space for the requested operation or evaluating potential. For instance, they may not check for sufficient disk space on a hard drive to which files will be copied prior to beginning the copy process. If insufficient disk space is encountered, the operation stops and the user is then notified. This may occur after the operation is largely complete.

When a user cancels a requested operation while it is in progress (e.g., the user selects a "cancel" button on a progress dialog), conventional copy engines stop the operation at that point in its progression. However, they do not cancel the operation to undo the moving or copying of files that occurred in the operation up to the point of interruption. Thus, selected files are left in an indeterminate state and users must figure out how to clean this up themselves.

Conventional copy engines process file name conflicts by prompting the user to select one of the conflicting files for storage at a selected destination. For instance, if a user attempts to copy a file to a destination in which a file of the same name resides, conventional copy engines will ask the user whether they want to keep the older file or the newer file. Subsequently, only the user-selected file is kept at the destination.

It is also known for computer systems to employ error handling systems to detect and correct data errors. These error handling systems operate at the data link layer of the known open systems interconnection reference model (OSI Model) to ensure correct data transmission and to verify that data has been written to or read from a memory location. For instance, conventional computer systems add a parity bit or a cyclic redundancy check (CRC) field to data to ensure the data is correctly transmitted between two devices or to ensure words are written to or read from memory. These error handling mechanisms are employed for computer operations at the data link layer of the OSI Model for detecting data errors, rather than for detecting or monitoring errors associated with moving or copying files.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present invention provide methods, user interface displays, computer-executable instructions, and data structures for handling and/or avoiding file operations errors. A file operations engine is provided according to an embodiment of the invention that manages many user interactions with their files via a computer system. In one aspect of the invention, the operations engine may provide the user with options for keeping two or more files that have conflicts for a requested operation, such as files having the same name. One option may include keeping both files when two files have the same name. Another option may include allowing the user to rename a conflicting file.

In addition, aspects of the present invention provide dialogs and user interface mechanisms for handling and/or avoiding conflicts and other errors. Further, aspects of the invention provide methods for handling and/or avoiding file operations errors.

In other aspects, computer-executable instructions for implementing the disclosed methods are stored on computer-readable media. These and other aspects are addressed in relation to the figures and related description.

BRIEF DESCRIPTION OF THE DRAWINGS

A more complete understanding of the present invention and the advantages thereof may be acquired by referring to the following description in consideration of the accompanying drawings, in which like reference numbers indicate like features.

FIGS. 14A and 14B illustrate an operation requested by a user via the user interface of FIG. 3 and a result of the operation according to an embodiment of the invention.

FIG. 18A illustrates a dialog according to an embodiment of the invention, which is shown on the user interface display of FIG. 3 in response to the operation request of FIG. 17.

FIGS. 18B, 18C and 18D illustrate potential results of the operation request of FIG. 17 according to embodiments of the invention.

FIGS. 19A, 19B, 19C and 19D illustrate an operation requested by a user via the user interface of FIG. 3 and potential results of the operation according to embodiments of the invention.

FIGS. 20A, 20B, 20C and 20D illustrate an operation requested by a user via the user interface of FIG. 3 and potential results of the operation according to embodiments of the invention.

FIGS. 21A, 21B, 21C, 21D and 21E illustrate an operation requested by a user via the user interface of FIG. 3 and potential results of the operation according to embodiments of the invention.

FIGS. 22A, 22B and 22C illustrate an operation requested by a user via the user interface of FIG. 3 and potential results of the operation according to embodiments of the invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

In accordance with aspects of the present invention, a graphical user interface (GUI) is provided on a computer for displaying output on the system's monitor and for managing user input. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As an example for illustrating aspects of the present invention, a system GUI is discussed, which may include an operating system GUI such as the GUI of a MICROSOFT WINDOWS operating system that may include the Win 32 subsystem (Win32). In these examples, the Win32 subsystem may have exclusive responsibility for displaying output on the system's monitor and for managing user input. Architecturally, this means that the other modules may need to call Win32 subsystem functions to produce output on the display. It also means that the Win32 subsystem may need to pass user input actions to the other modules when the user interacts with their folders. In addition, it means that system commands, such as commands to copy files, may initially be captured by the Win32 subsystem. It is understood that with other operating systems and other types of system level user interfaces may be responsible for monitoring and managing user input.

Figure 1:
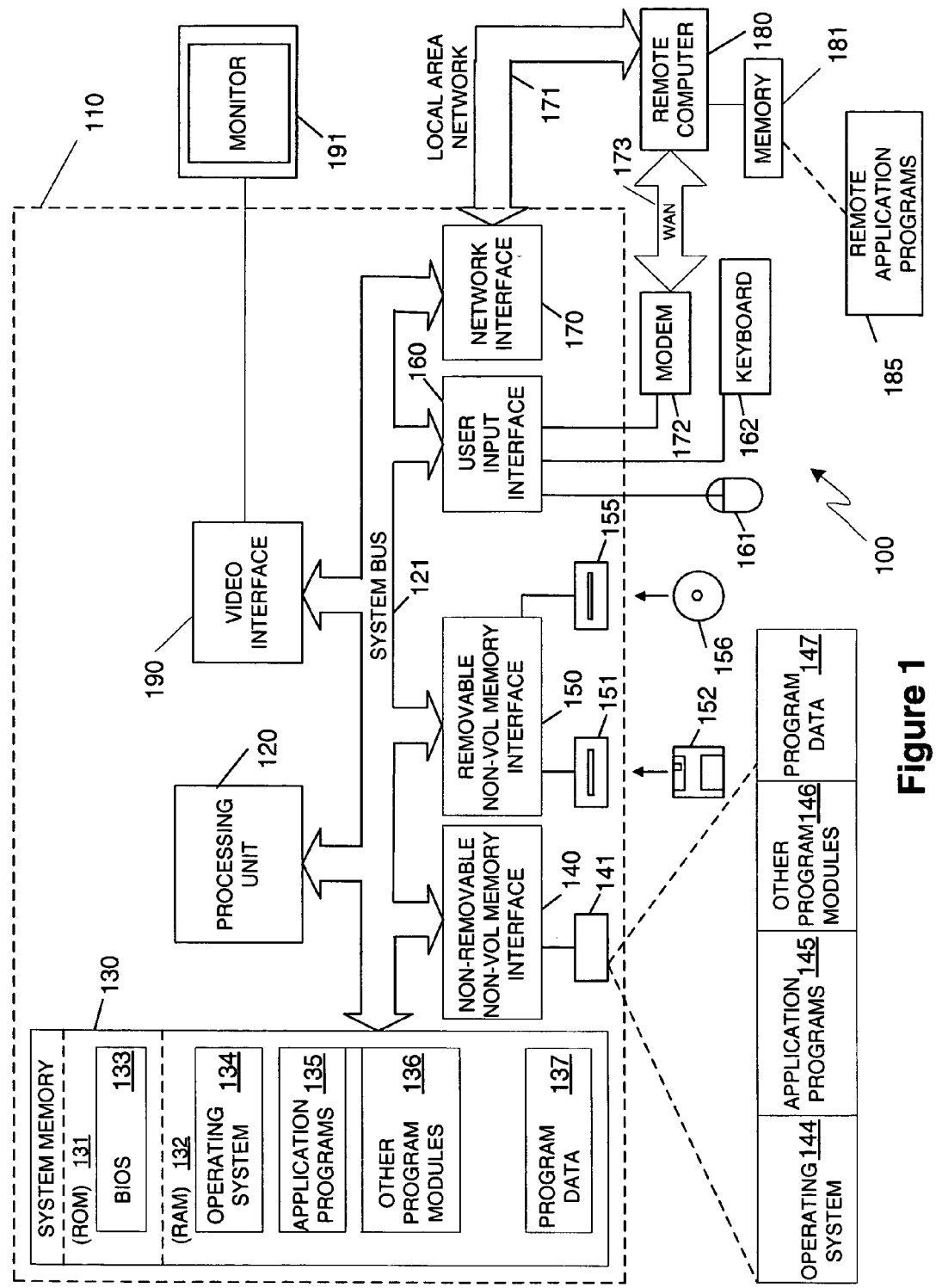
FIG. 1 is a functional diagram of a general-purpose computer supporting one or more aspects of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Exemplary computer system environment 100 for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures, include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 134, application programs 135, other program modules 136, and program data 137. Note that these components can either be the same as or different from operating system 134, application programs 135, other program modules 136, and program data 137. Operating system 134, application programs 135, other program modules 136, and program data 137 are given different numbers here to illustrate logical differences.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers and printers, which may be connected through an output peripheral interface.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
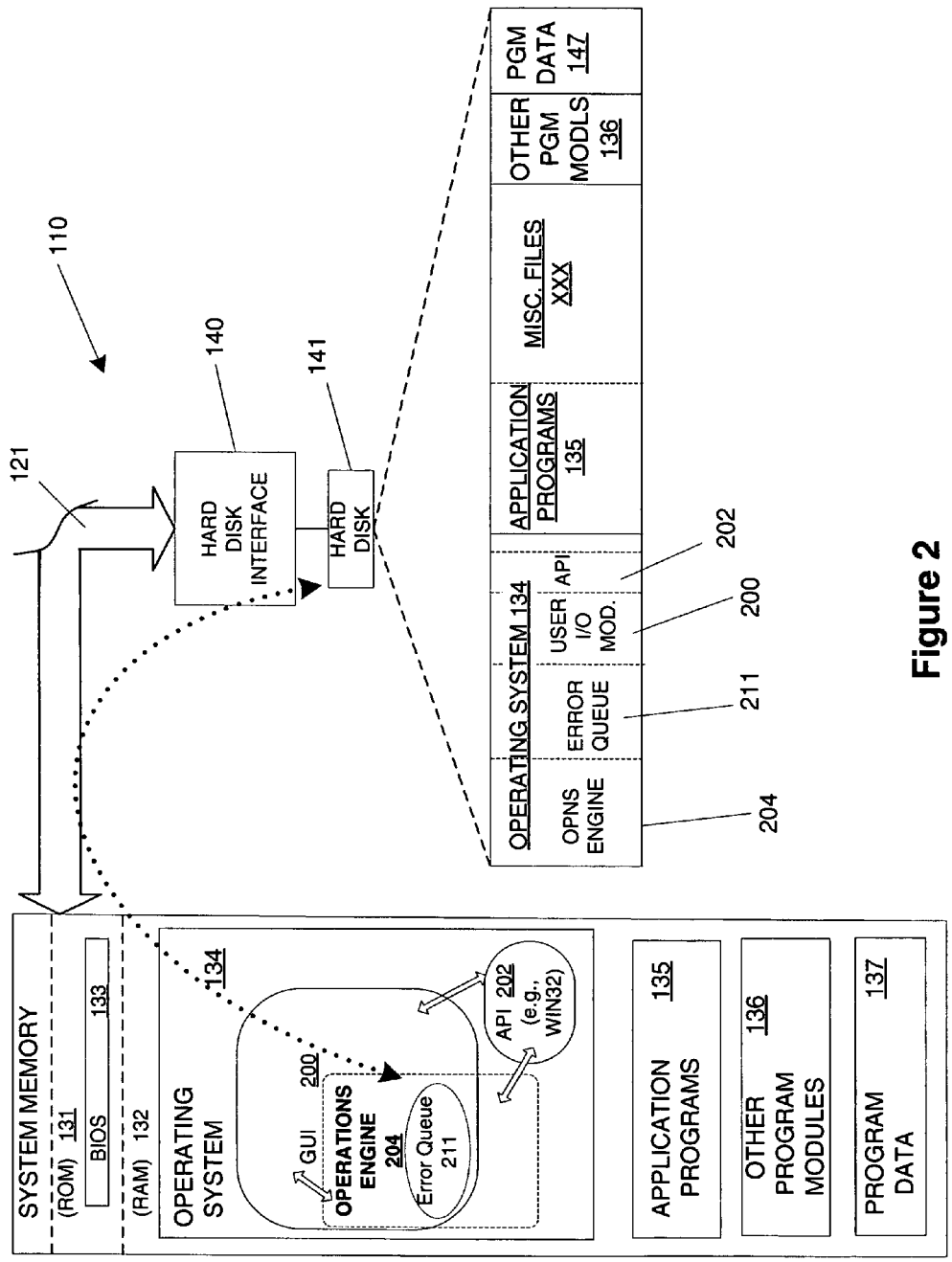
FIG. 2 is a close view of portions of the functional diagram of FIG. 1.

FIG. 2 shows a closer view of functional portions of computer 110 to illustrate an example configuration using a MICROSOFT WINDOWS operating system for operating system 134. In this example, operating system 134 includes a GUI 200, a user interface application programming interface (API) 202, and an operations engine 204. Operating system 134 may be a version of the MICROSOFT WINDOWS operating system, such as MICROSOFT WINDOWS 95, 98, NT, 2000 or XP. GUI 200 is the operating system user interface that displays output on the system's monitor and manages user input. User interface API 202 is a type of interface that, with respect to versions of the MICROSOFT WINDOWS operating system, permits computer programs to host (i.e., control) folders within GUI 200 provided by the operating system. For the embodiments discussed herein, the folders are of a predetermined type as dictated by the operating system—e.g., folders of the MICROSOFT WINDOWS operating system. API 202 may be the API known within the art as the WIN32 API. The WIN32 API is utilized for, among other functionality, to provide for the hosting of folders by application programs running within the MICROSOFT WINDOWS operating system.

In general, operations engine 204 is a file operations system that permits users to interact with files, such as to move, recycle (i.e., delete files by moving them to a recycle bin), and copy files. It may also permit users to expunge files (i.e., permanently remove the files), rename, set access control lists (ACLs), encrypt, compress, and/or set properties for files. The operations engine provides user interface dialogs and receives user commands related to file operation commands, and manages file operations. For instance, the operations engine receives and manages a user's request to move certain files from one location to another. In another example, the operations engine manages and interacts with the user during installation of a new program. The operations engine 204 runs as part of the shell process. However, in other embodiments, the operations engine may be extensible, and/or portions of it may be extensible, to allow for the creation and expression of new file operation rules, methods, and/or dialogs as needed. The operations engine 204 may also include a data structure for an error queue 211 that stores information about errors encountered during file operations. In other embodiments, the error queue may be stored in other locations.

As further shown in FIG. 2, application programs 135 are programs running or that may run within operating system 134. For example, the programs may be application programs such as word processing programs, spreadsheets, web browsers, etc. In operation, when any of the programs, GUI 200, operations engine 204, or other program modules 136 needs to host a folder within GUI 200, it calls a function defined within WIN32 API 202, as is known within the art. WIN32 API 202 returns a handle, or identifier, referencing the folder that it created within GUI 200 provided by operating system 134. Those of ordinary skill within the art will appreciate that while computer 110 has been described in relation to the MICROSOFT WINDOWS operating system, folders of the MICROSOFT WINDOWS operating system, and the WIN32 API, the invention is not so limited.

In the previous section, an overview of the operation of an example computer 110 was described. In this section, embodiments illustrating aspects of the present invention will be discussed using computer 110 for illustration purposes. It is understood that the invention, as well as the following embodiments, may be used with a variety of other computer systems.

Figure 3:
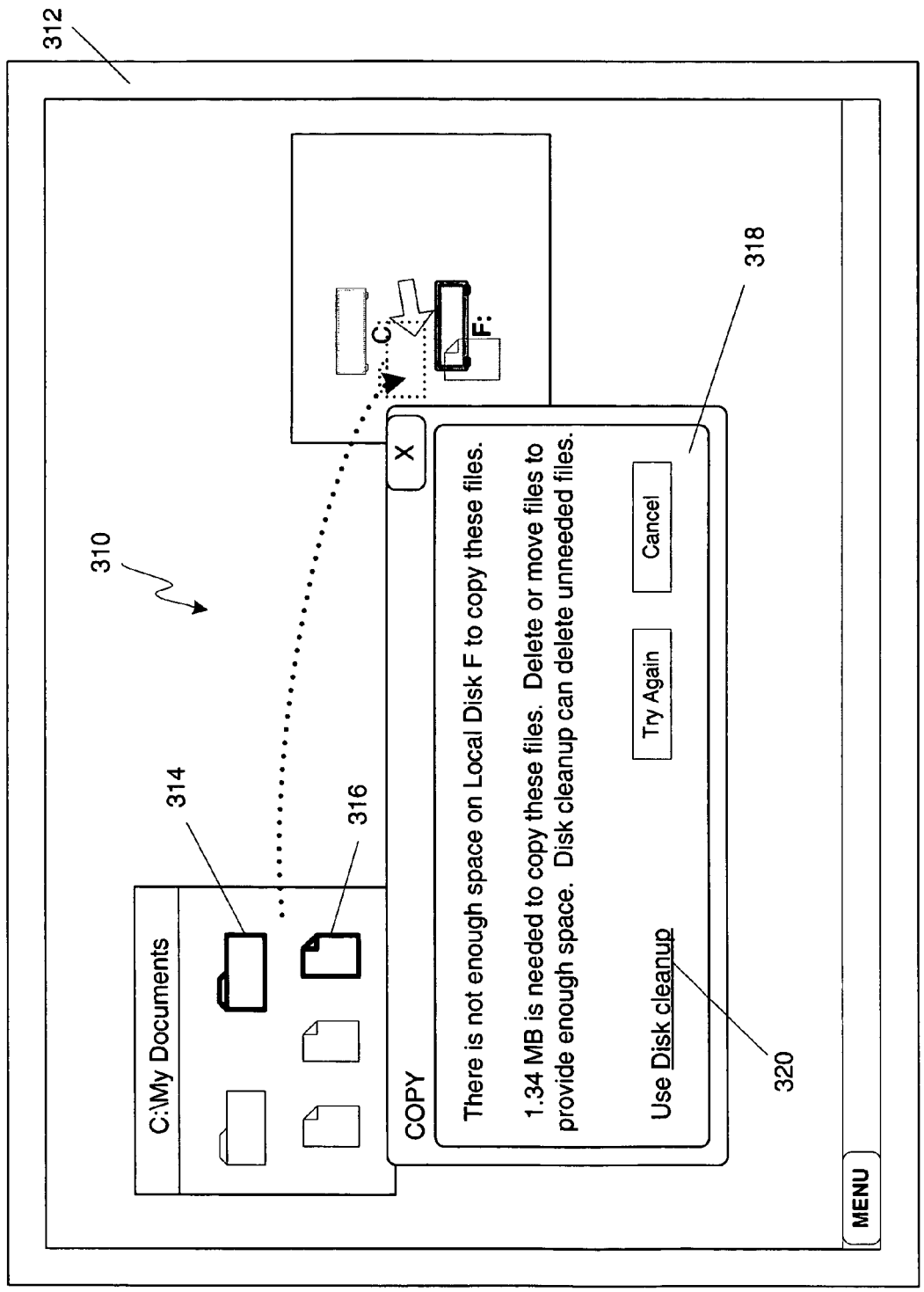
FIG. 3 shows a graphical user interface display on the computer of FIG. 1 according to an embodiment of the invention.

Referring now to FIGS. 3-23C, computerized methods, data structures, user interfaces, and computer-readable instructions according to embodiments of the invention are generally shown. FIG. 3 shows a graphical user interface display 310 on the monitor 312 of the computer of FIG. 1 according to an embodiment of the invention, which is generated by GUI 200. For the embodiments discussed hereafter, GUI 200 provides the user interface displays and monitors the system for user inputs. Operations engine 204 cooperates with, and/or may be a co-extensive with, the GUI. Thus, the program instructions of operations engine 204 may be a part of GUI 200 or may be partially or completely extensible from the GUI. Alternatively, operations engine 204 may include program instructions outside of operating system 134 that provide some of the functionality discussed hereafter. In addition, operations engine 204 and GUI 200 may be protected subsystem code operating within a user mode portion of operating system 134.

As shown in FIG. 3, user interface display 310 is an example display that is provided after a user has requested a file copy operation. In the example shown, the user has requested that folder 314 and file 316 in the folder "My Documents" on the user's C drive be copied to the F drive. The requested copy operation may be requested by various mechanisms, such as by the user selecting folder 314 and file 316 via a remote control device, a mouse, or another input hardware device. The display includes a dialog 318 that informs the user that there is insufficient disk space on the F drive to perform the requested operation. As shown, dialog 318 notifies the user of the error and provides various options for the user to select ("Try Again" and "Cancel"). The dialog also includes an actionable link 320 to a disk cleanup utility that may increase free space on the F drive. Dialog 318 is an example dialog provided after operations engine 204 performs preliminary calculations to identify errors that may be generated when the requested operation is processed. Dialog 318 and various dialogs discussed hereafter are provided to the user via operations engine 204.

In conventional copy engine systems, when encountering an error while processing more than a single file, the error is thrown and all processing stops until the user responds to the particular error. This is particularly problematic when copying or moving large numbers of files. For example, in conventional copy engine systems, if there is a folder name conflict, the conflict is shown in an error dialog and processing of the entire operation stops until the user responds to the error dialog. When the user responds, processing starts up again. However, the user isn't any closer to the operation being done and there are a variety of unambiguous things that the copy engine could have processed without waiting for this particular response.

In general, operation engine 204 attempts to provide as much processing as possible of a requested operation without encountering errors, without showing error dialogs to the user, and/or without waiting for user responses to error dialog. Although referred to as 'operations engine 204' based on the exemplary computer system 100, it is understood that various embodiments of 'operations engine 204' discussed hereafter may include only some or all features, functionality and aspects of the various operations engine configurations discussed herein. In other words, operations engine 204 is a portion of an embodiment of exemplary computer system 100, but does not necessarily represent a single embodiment of the operations engine. Various operations engine embodiments are discussed hereafter in the context of computer system 100 along with figures herein.

Figure 4:
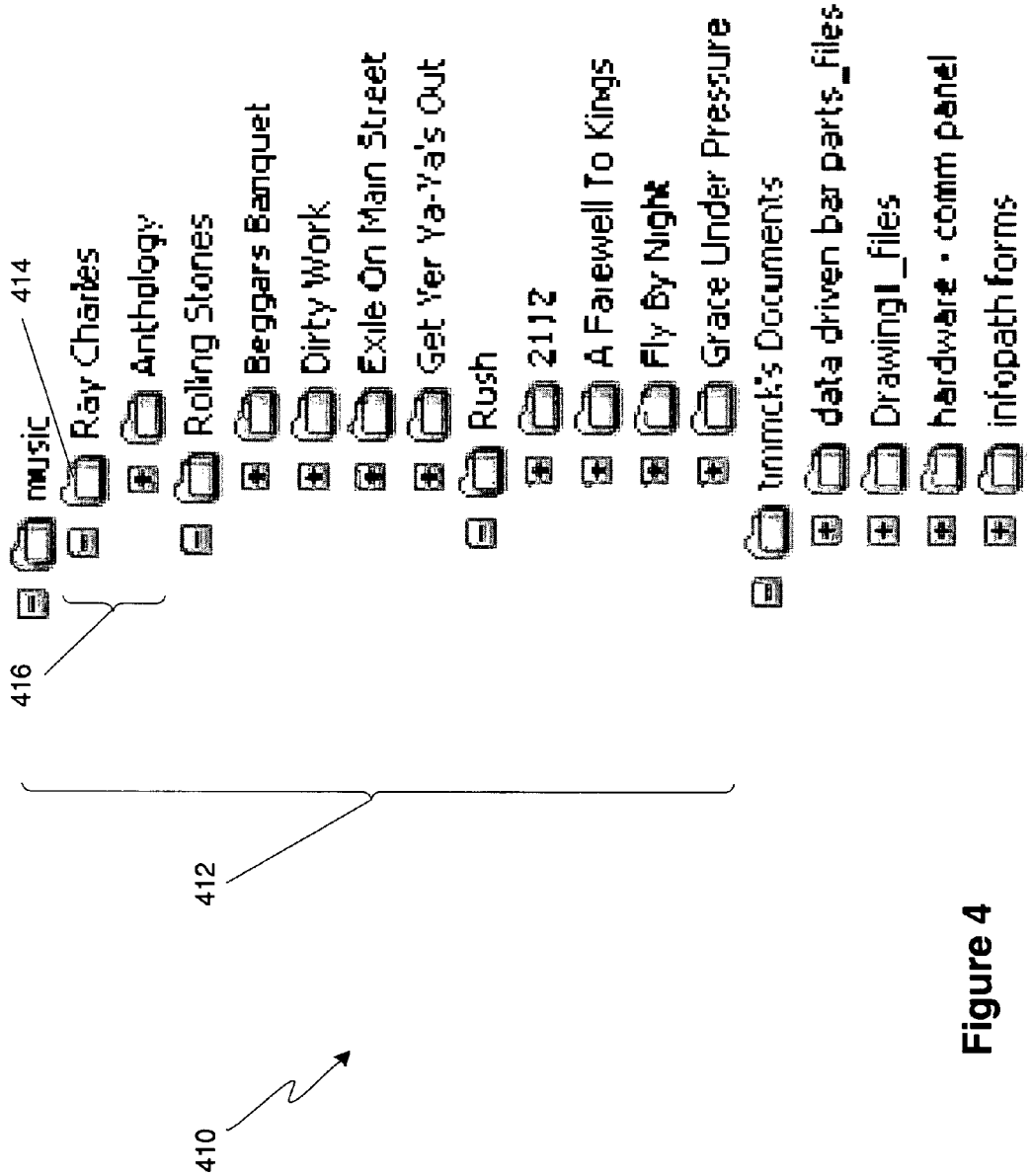
FIG. 4 shows example trees for the file folder "music" and the file folder "timmck's Documents" for illustrating aspects of the present invention.
Figure 5:
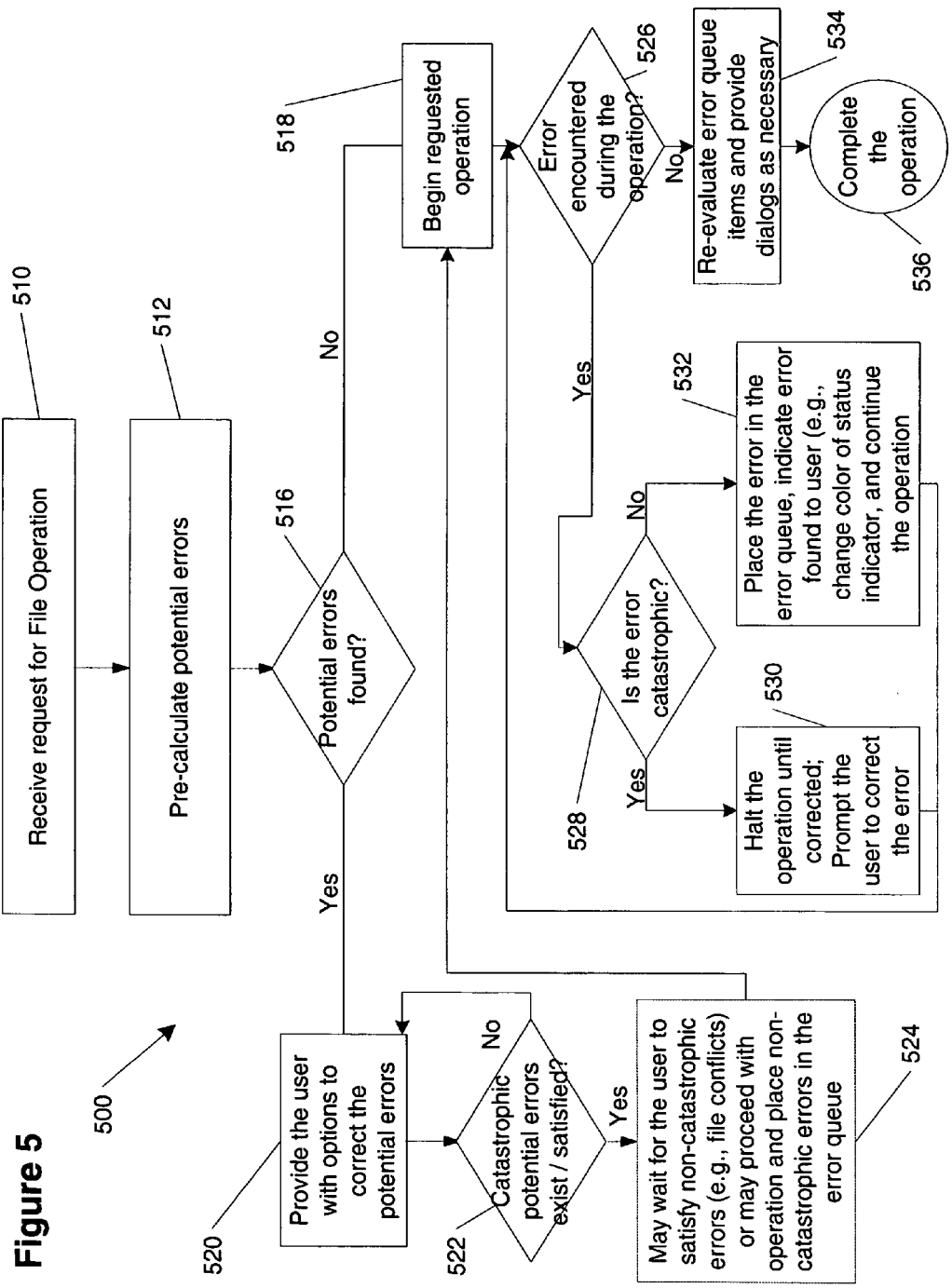
FIG. 5 is a flow diagram illustrating a method for processing file operations according to embodiments of the invention.

FIG. 4 shows example trees for the file folder "music" and the file folder "timmck's Document" for use with discussing some of the operations of embodiments of the operations engine, and FIG. 5 shows a flow diagram that illustrates a method 500 for processing file operations according to embodiments of the invention. FIG. 4 is provided for discussing method 500 in the context of an example file structure and for use with discussing other embodiments of the invention. As shown, FIG. 4 includes Music tree 412 containing a Ray Charles folder 414 and Ray Charles sub-tree 416.

As shown in FIG. 5, in a first step 510, operations engine 204 receives a request to perform a file operation. Although the requested operation in this example is requested by a user, it is understood that requested file operations that take advantage of operations engine functionality according to the present invention may originate from other sources, such as other software via automatic updates to a program, system maintenance, installation of a new program, etc. Assume as an example that a user requests that the entire Music tree 412 of FIG. 4 containing Ray Charles folder 414 is copied to another folding containing another "Ray Charles" folder (not shown). In a subsequent step 512, operations engine 204 pre-calculates potential errors for the full operation. The pre-calculation considers potential errors that may be encountered while processing the requested operation, such as lack of sufficient disk space for the operation, file conflicts (e.g., same name conflicts, older file replacing a newer file, etc.), recycling or expunging a system file or an executable file, traversing permissions on subdirectories, etc. Pre-calculating potential errors for the requested operation front-loads as many error dialogs as possible, which places these dialogs on the user's screen when the user is most likely at the PC (particularly if the user tends to leave their computer during long operations), and also places the error dialogs on-screen before a large time investment in the operation has begun or before files have begun being processed.

In the embodiment of FIG. 5, operations engine 204 traverses appropriate file systems in depth first for the pre-calculations step 512 and for the processing of the requested operation. This is to say, if a folder has sub-folders, it processes these sub-folders in order and if the first one has its own sub-folders, it processes these before moving on.

In the example of FIG. 4, operations engine 204 begins processing Music tree 412 and starts with Ray Charles folder 414; it processes "Anthology" before moving on to start "Rolling Stones" and processes all four of the sub-folders before continuing to "Rush". The entire Music tree 412 is thus processed before the operations engine moves on to "timmck's Documents."

For step 516, if potential errors are not found, then step 518 occurs to begin the requested operation. If potential errors are found, then for step 520 the user is provided with options to correct the potential errors. In the example of FIG. 4, based on the folder name conflict for the Ray Charles' folders, and/or if files in the Ray Charles folder 414 have the same name as files in the Ray Charles folder at the copy destination, the operations engine will discover these potential conflict errors and will provide one or more conflict dialogs to the user prior to processing the operation. The operation can then proceed more smoothly without encountering these errors during the requested operation.

According to step 522, operations engine 204 may evaluate whether the potential errors are catastrophic and, if so, whether they are satisfied (e.g., via user interaction to correct the error). One of the most obvious errors that operations engine 204 can front-load is insufficient disk space at the destination (e.g., fixed drive, removable media, or a network location), which is a catastrophic error in that it prevents the requested operation from being completed. Thus, at the start up of a requested copy process, operations engine 204 can calculate the required space. If the destination does not have sufficient space, an error dialog such as dialog 318 of FIG. 3, can be shown to the user.

As shown for step 524, the operations engine may wait for the user to satisfy all potential errors shown to the user before proceeding with the requested operation.

However, the operations engine may also proceed with the requested operation to the extent it is able without waiting for user input, which may occur after a time-out period to permit the user to respond to error dialog(s). If the operations engine proceeds even though potential errors are not satisfied, and/or if errors are encountered during processing of the operation per step 426, then the errors are placed in an error queue 211.

The error queue is preferably established for several classes of errors, which may include all non-catastrophic errors, specific types of errors, etc. When errors within the error queue classes are encountered, the affected file/folder errors are added to the error queue, or rather an identification of the affected file/folders and their errors are listed in the error queue. The error queue itself is simply a record of errors encountered during the processing of a requested file operation, which may be located in temporary and/or long-term memory, such as in system memory, on a hard drive, etc. Processing will continue on other files/folders that are unaffected by the errors, with other errors being placed into the error queue when encountered. When all processing that can be completed is finished, the operation engine can re-try the operation on the first item in the error queue. If this succeeds, the operations engine proceeds to the next error item; if it fails, an error dialog is shown to the user. In addition, the user may be able to view a list of errors in the error queue while the requested operation is being processed, and may be able to satisfy those errors during processing via error queues.

The error queue permits as much processing as possible to be performed before errors are thrown. In other words, the operations engine will pre-throw as many errors as possible and then hold as many errors as possible until the end of the processing. In the example case of FIG. 4, operations engine 204 can place the Ray Charles sub-tree 416 in an error queue and continue processing the folders that are peers to Ray Charles folder 414. Once the rest of the tree Music tree 412 is finished, copying of Ray Charles sub-tree 416 is attempted again and, if there is still an error, a "Confirm Folder Replace" error can be shown to the user.

Not every error can be handled this way; some are so catastrophic that the requested operation cannot continue without throwing an error immediately. For example, if a network connection required for performing the operation is disconnected, the operations engine will immediately throw a network error. Likewise, if the destination location runs out of storage space during processing, an error will immediately be thrown. Most catastrophic errors will be caught up-front during the pre-calculation step, but there are numerous shared disk scenarios where multiple processes are consuming disk space that may continue and cause an out-of-disc space error to be thrown. In any event, before and/or during processing of the requested operation, the operations engine can perform the step 528 of evaluating whether an encountered error is catastrophic. If the error is catastrophic, then the operations engine performs the step of 530 of halting the operation until corrected. Once the catastrophic error is corrected, processing continues.

Non-catastrophic errors identified in the pre-calculation step 512 can be placed in the error queue per step 524 prior to processing the operation. Further, according to step 532, non-catastrophic errors that occur during processing of the requested operation are placed in the error queue, which permits processing of unaffected files and folders to continue. When all processing is completed with the exception of error queue items, then the step 534 occurs to re-evaluate error queue items and to provide error dialogs to the user for remaining errors. Once the errors are satisfied, then step 536 of completing the operation occurs.

Figure 6:
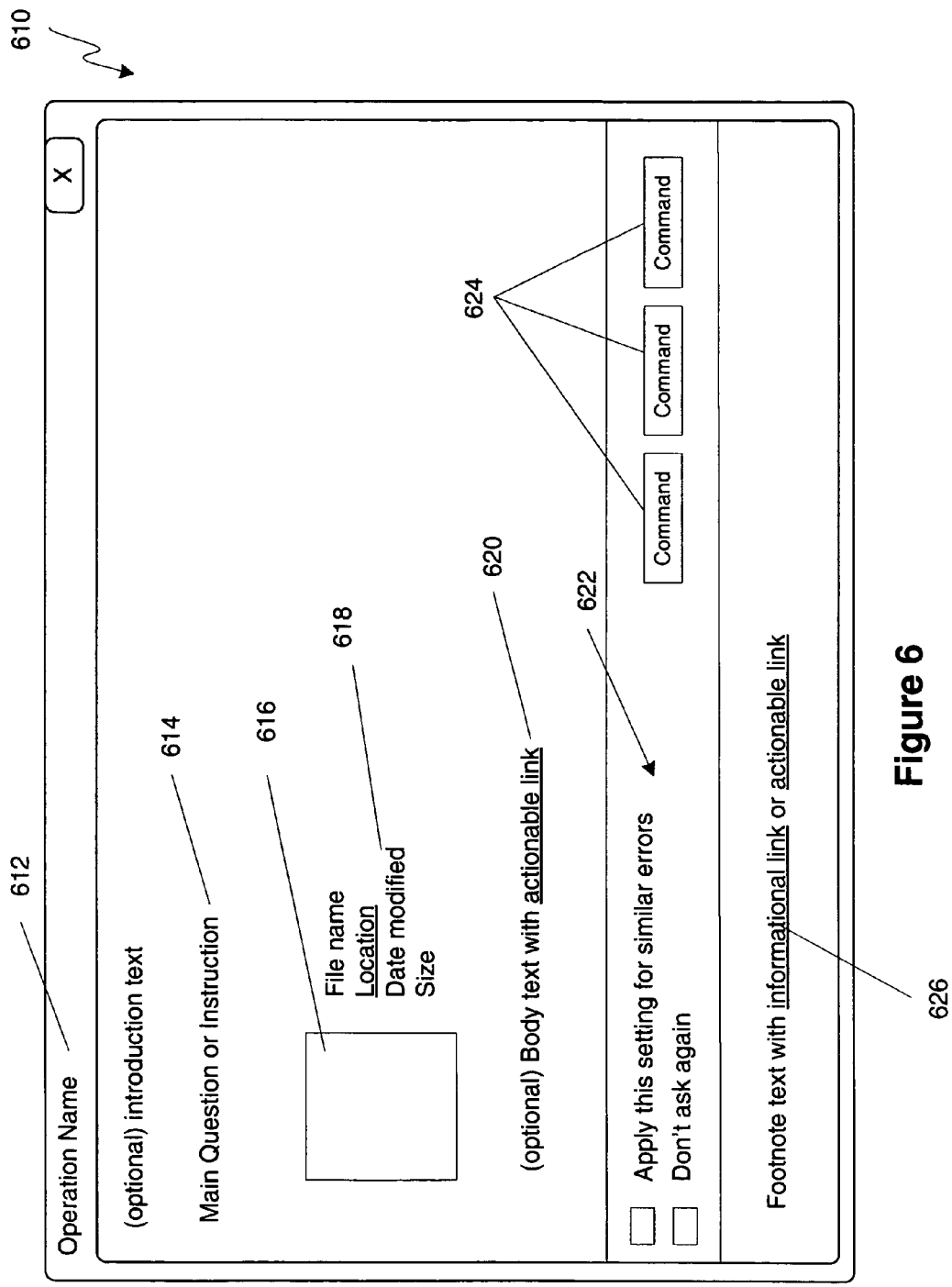
FIG. 6 shows a dialog template for dialogs shown on the display of FIG. 3 according to embodiments of the invention.

FIG. 6 shows a dialog template 610 for error dialogs shown on the display of FIG. 3 according to another embodiment of the invention. Dialog 610 shows the name of a requested file operation 612, such as "Copy" for copying files, and may show the status of the operations (e.g., 'preparing to' copy during the step of pre-calculating errors). It also identifies the error and/or asks the user a question 614 for satisfying the error, such as "How would like to proceed?"Dialog 610 further shows the file or folders 616 pertaining to the error and details of the file 618, such as name, location, date modified and size. It may also include text 620 that may assist with satisfying the error, such as a link to a disk cleanup utility for freeing up disk space, or that may provide further information. The dialog further includes options 622 for handling similar errors, such as to satisfy them in a similar manner, and command options 624 for satisfying the error. Options 622 for handling similar errors can reduce the amount of user interaction required and can improve efficiency of the operation engine 204 for handling requested operations. The dialog may also include footnote text 626 that can have links to further information or further actions.

Figure 7:
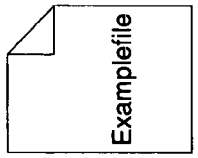
FIGS. 7-12, 13A and 13B show dialogs that may be shown on the display of FIG. 3 according to further embodiments of the invention.
Figure 8:
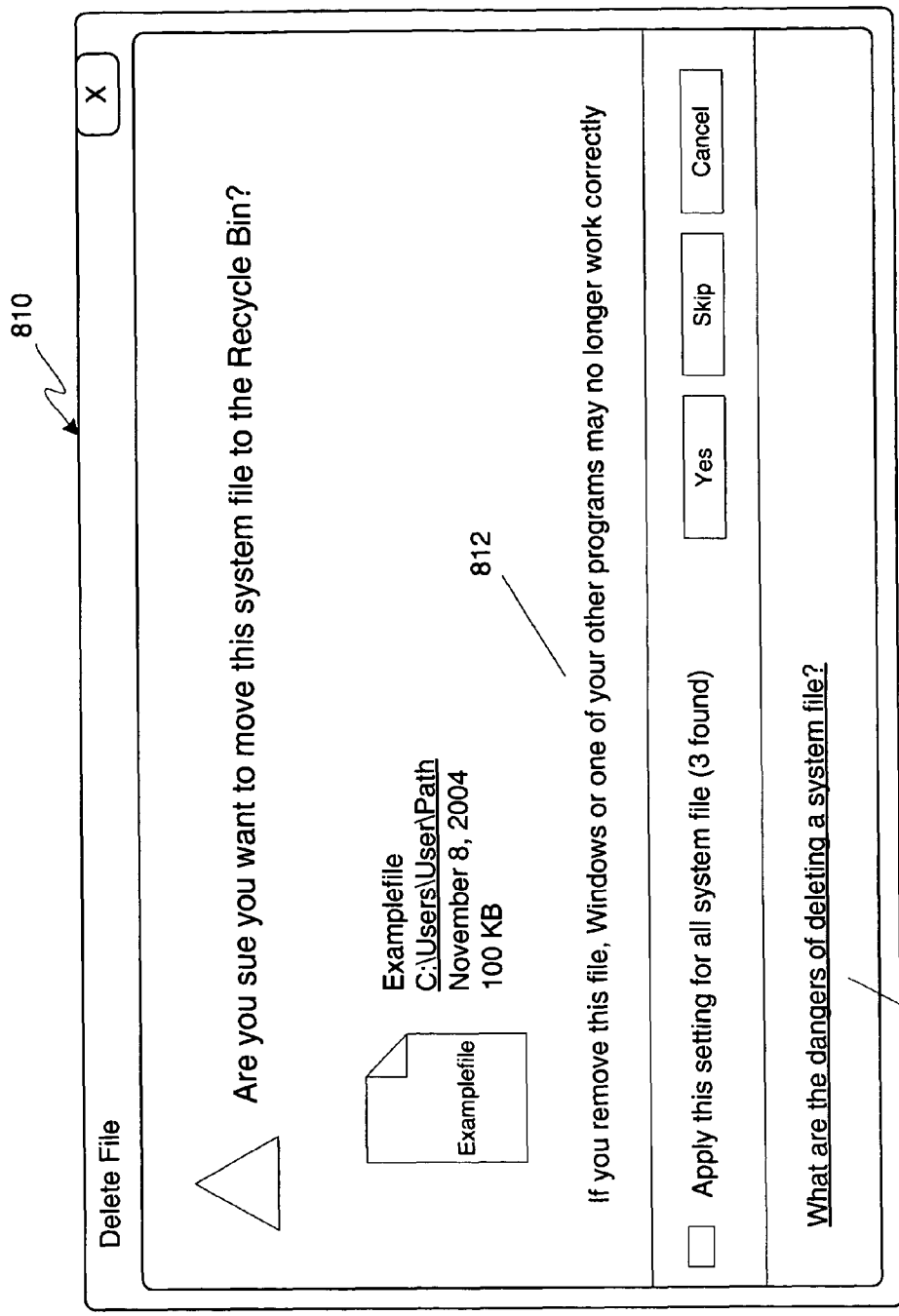
Figure 9:
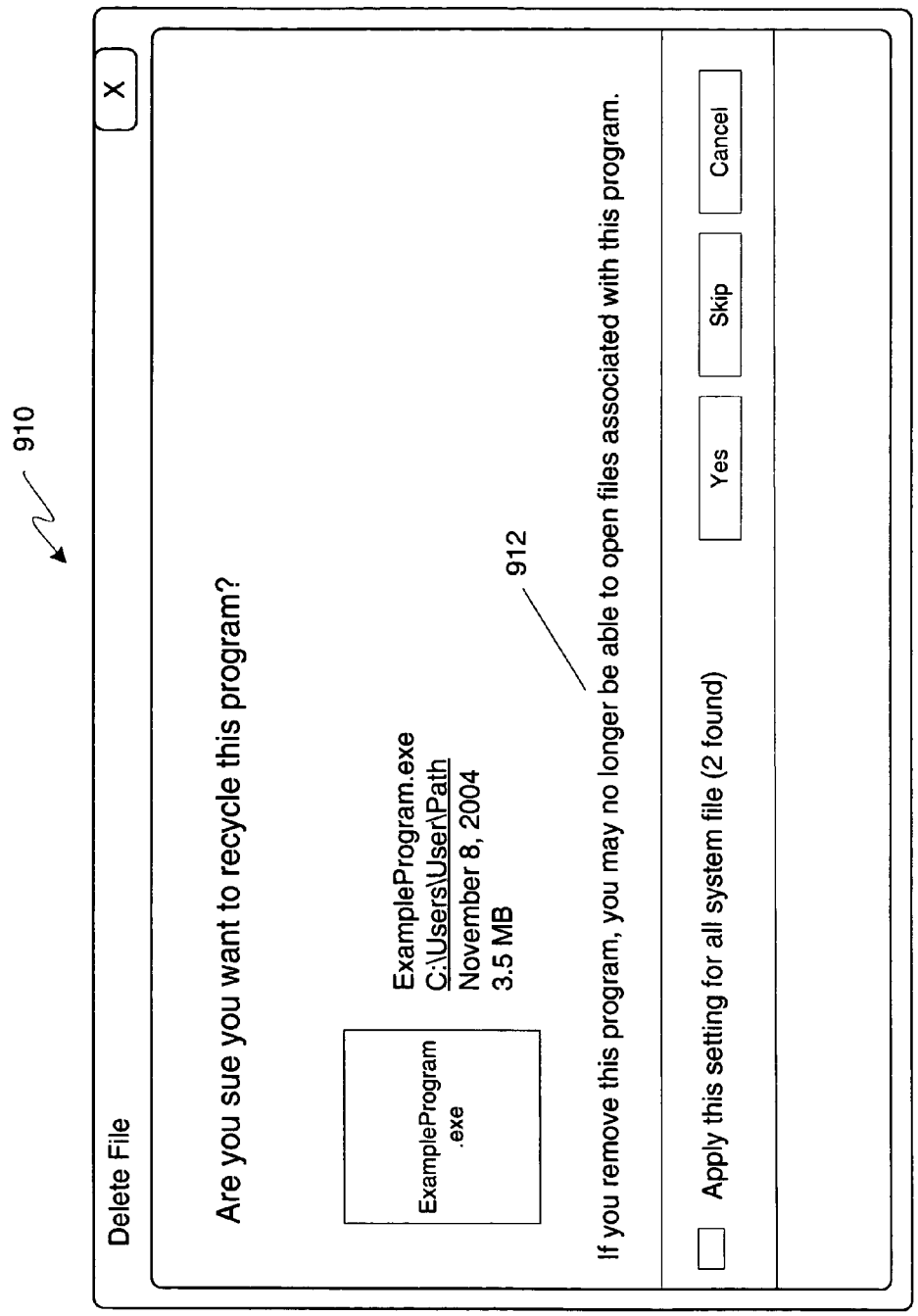
Figure 10:
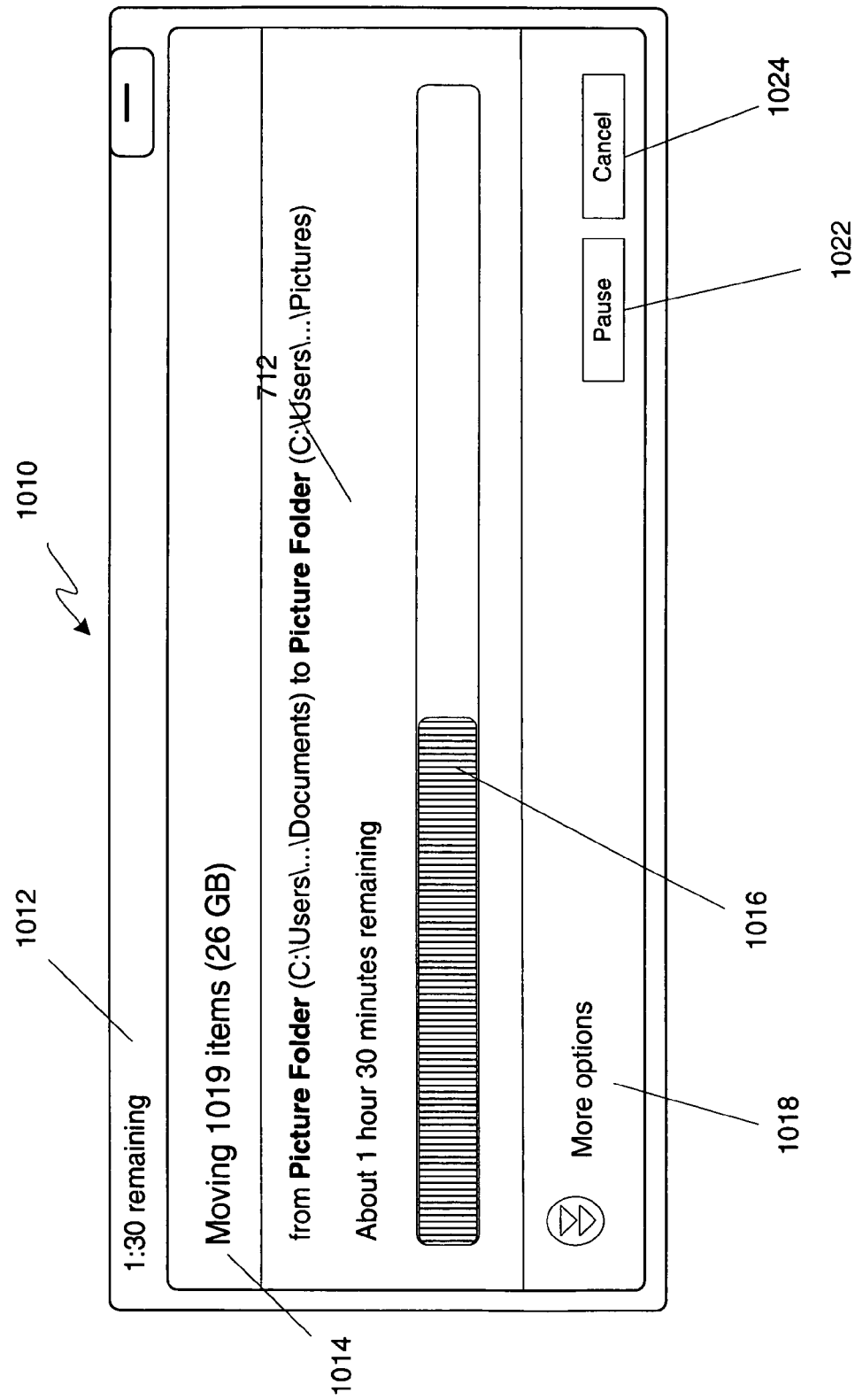

FIGS. 7-9 show dialogs 710, 810 and 910 according to further embodiments of the invention that may be shown on the display of FIG. 3. Preferably, these dialogs are shown to the users as a result of pre-calculation step, such as step 512 of method 500. However, they may be provided during processing of a requested operation (e.g., during steps 526 or 534 of method 500). Dialog 710 indicates that the user needs permission to copy a file that is part of a requested operation. Preferably, this is an error that would have been identified during the pre-calculation step 512 of method 500. As shown, dialog 710 identifies the user from whom permission is required, and includes an actionable link 712 to that user. Dialog 710 also includes the option 714 of applying the user selected command to other permission problems for the requested operation. In the example shown, the user is provided with the command options of trying to copy the file again, skipping the file as part of the requested operation, or canceling the requested operation.

Dialog 810 shown in FIG. 8 confirms that the user wants to recycle the identified file, which will occur as part of a requested operation. Preferably, this is an error that would have been identified during the pre-calculation step 512 of method 500. As shown, dialog 810 includes a warning 812 of consequences associated with removing the file. Dialog 810 also includes an informational link 814, which, when selected, provides the user with additional information related to the error dialog.

Dialog 910 shown in FIG. 9 confirms that the user wants to recycle the identified application or other executable file, which will occur as part of the requested operation. Preferably, this is an error that would have been identified during the pre-calculation step 512 of method 500. As shown, dialog 910 includes a warning 912 of consequences associated with removing the executable file.

The dialogs of FIGS. 7-9 are only examples of error dialogs that are preferably shown as a result of pre-calculation step 512 of method 500. Dialog 318 shown in FIG. 3 is another example. Various other dialogs may be presented as a result of pre-calculation step 512 or at other times for a wide variety of errors and potential errors. For instance, operations engine 204 preferably presents error dialogs in the event a requested operation will result in the recycling or expungement of system files or folders, or of other folders designated as special by the operating system, such as a recycle bin folder. Although possible, operations engine 204 preferably does not provide error notifications based on the user requesting an operation that would recycle or expunge a read-only file or folder or that would recycle a file or folder that has hidden attributes (e.g., hidden files and folders).

FIGS. 10-12 and 13A show various progress dialogs that are shown during the processing of a requested file operation. Dialog 1010 is a dialog that preferably appears during step 518 of method 500 when the requested file operation begins. As shown, dialog 1010 includes a title bar 1012 that indicates the time remaining for processing the requested operation. If the requested operation completes without any errors, then the dialog preferably disappears on its own. Dialog 1010 further includes a status title 1014 that indicates the action occurring for the requested operation. As shown, the status title indicates that the computer is moving 1,109 items totaling 26 GB. When the operation is beginning, the status title may have stated, "Preparing to move 1,109 items (26 GB)" or similar language. Dialog 1010 also includes a status identifier 1016, which in the configuration shown is thermometer-type progress bar.

The status identifier changes as the operation progresses to provide a general indication to the user of its progress.

Preferably, status identifier 1016 provides an indication to the user that errors have been encountered that are listed in the error queue. For example, status identifier 1016 may be a green colored progress bar when no errors have been encountered. If an error is encountered and placed in the error queue, the progress bar may change to red. Other indications may also be used, such as causing the status identifier to blink, adding an error alert to the dialog, presenting an error list in a separate dialog or as part of dialog 1016, etc. Dialog 1016 also includes a selection 1018 for more options, which may include an error list, various options, commands, etc. In addition, dialog 1016 includes command options, such as pause button 1022 and cancel button 1024.

User selection of the pause button 1022 will cause the requested operation to pause and to change the indication on button 1022 to state "resume" while in the paused state. User selection of the cancel button 1024 will cause the requested operation to stop and to undo as much of the requested operation that had been performed. Thus, selection of the cancel button 1024 will put the user's machine back into the state that it was in before the requested process began.

Figure 11:
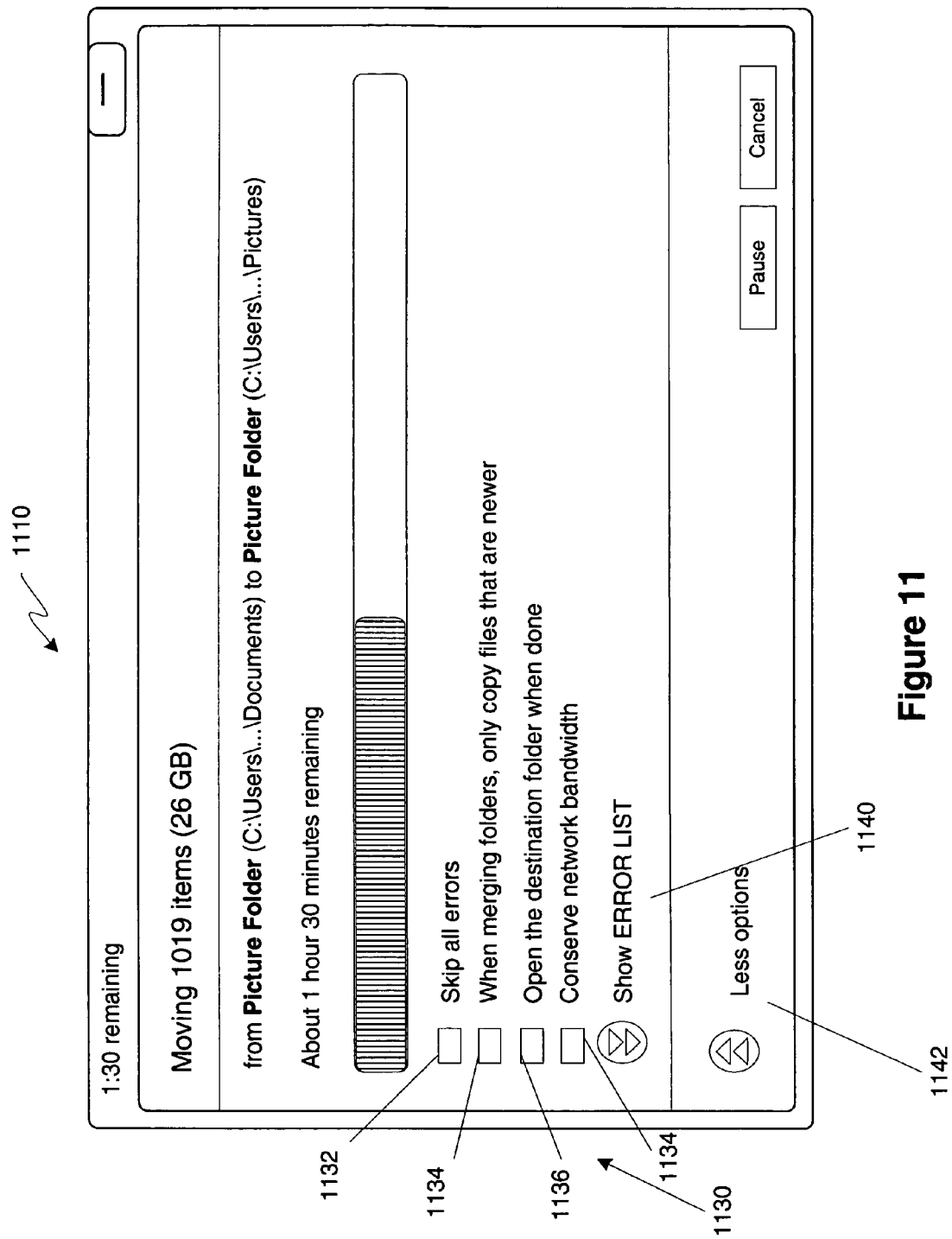

Dialog 1110 shown in FIG. 11 is generally the same as dialog 1010, except that it includes additional options 1130. Dialog 1110 may be shown in response to the user selecting the 'more options' selection 1018 on dialog 1010 to view additional options.

As shown, dialog 1110 includes a first option 1132 to skip all errors and a second option 1134 to copy only files that are newer into a merged destination folder. If the user selects the merge option 1134, the operations engine 204 compares the date and time on files with conflicting names in the source and destination trees, and then it only copies a particular file to the destination folder if the incoming file is newer. Thus, only updated files are copies to a destination folder, which can be useful for periodically backing up a file tree or updating certain folders. Dialog 1110 further includes a third option 1136 to open a destination folder for the requested operation when the operation is complete, and a fourth option 1138 to conserve network bandwidth. User selection of the fourth option 1138 permits the operation to proceed at various rates based on network bandwidth required for the operation. Dialog 1110 also includes a fifth option 1140 to show an error list identifying errors placed in the error queue. It is understood that many other options and combinations of options may be presented to the user. Dialog 1110 also includes a selection 1142 to hide options 1132-1140.

Figure 12:
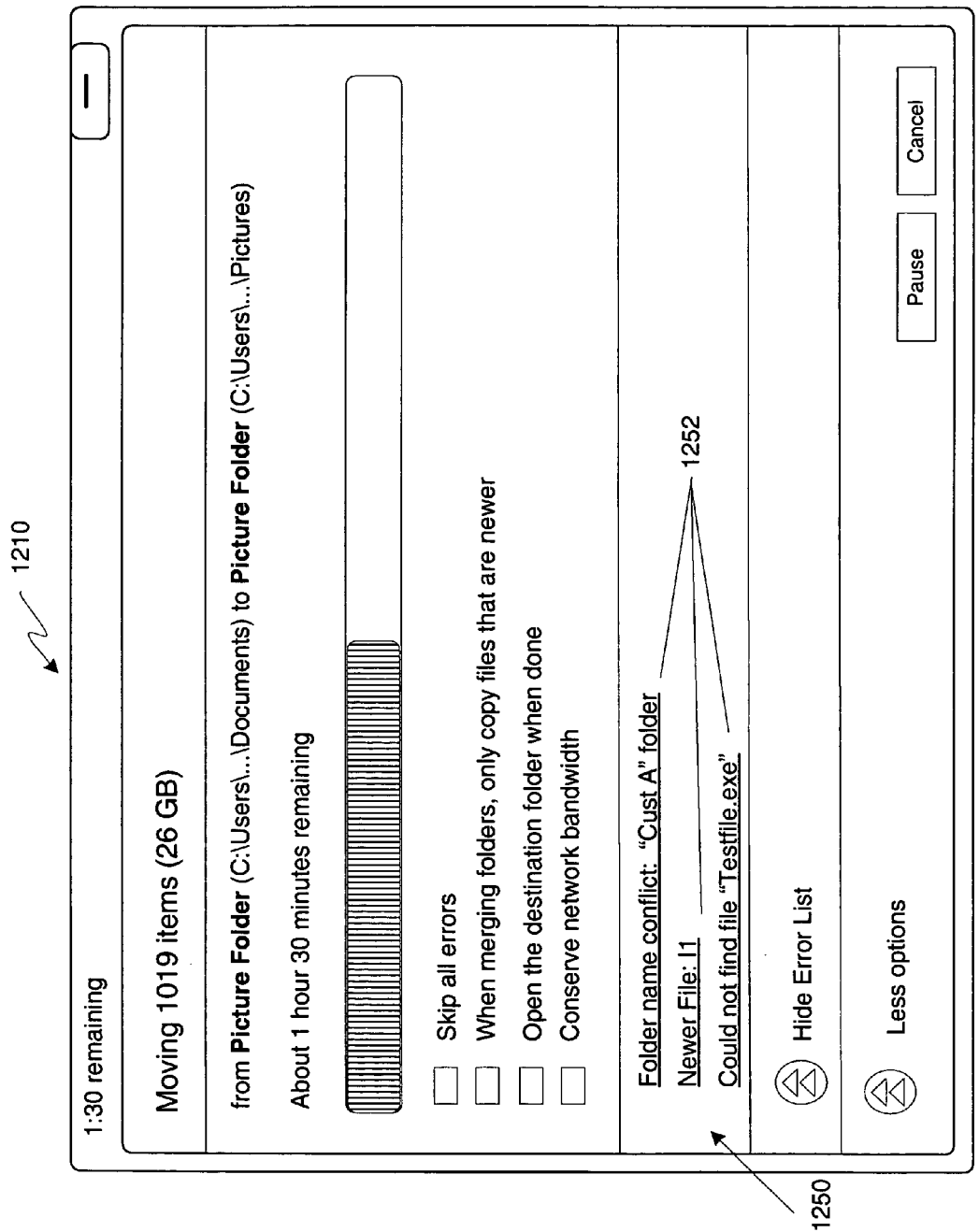

Dialog 1210 shown in FIG. 12 is generally the same as dialog 1110, except that it also includes an error list 1250. Dialog 1210 along with error list 1250 may be shown in response to the user selecting the "show error list" fifth option 1140 on dialog 1110 to view the error list. Error list 1250 includes links 1252 that summarize errors identified during processing of the requested operation that have been placed in the error queue 211. If the user selects one of the links, an error dialog associated with the selected link is shown, such as one of the dialogs of FIGS. 6-9.

Figure 13A:
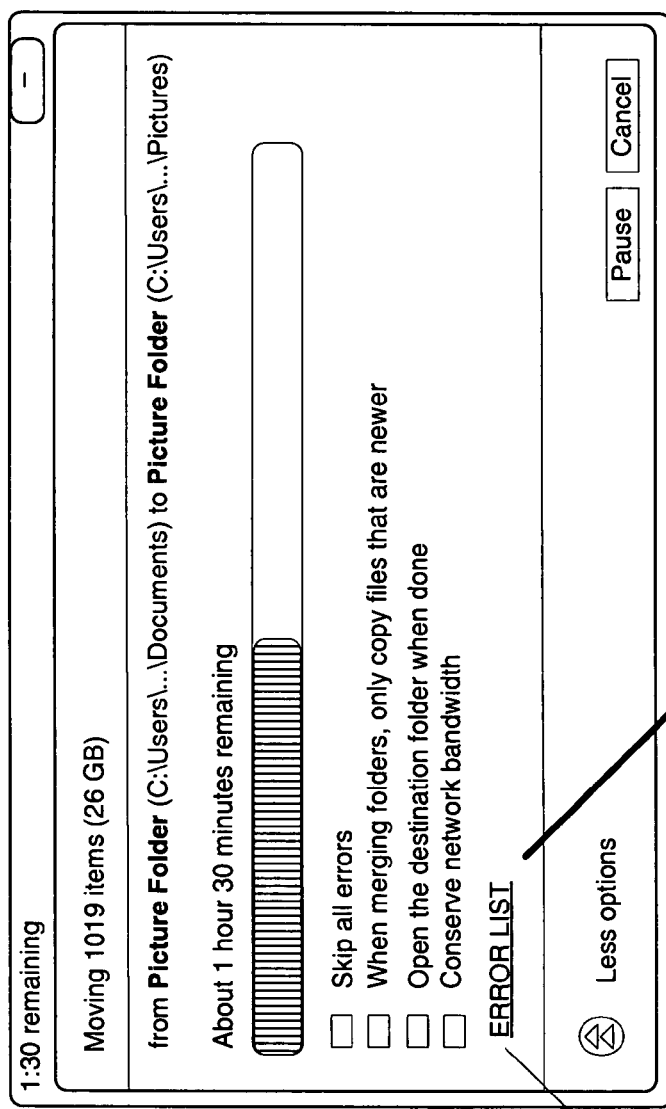
Figure 13B:
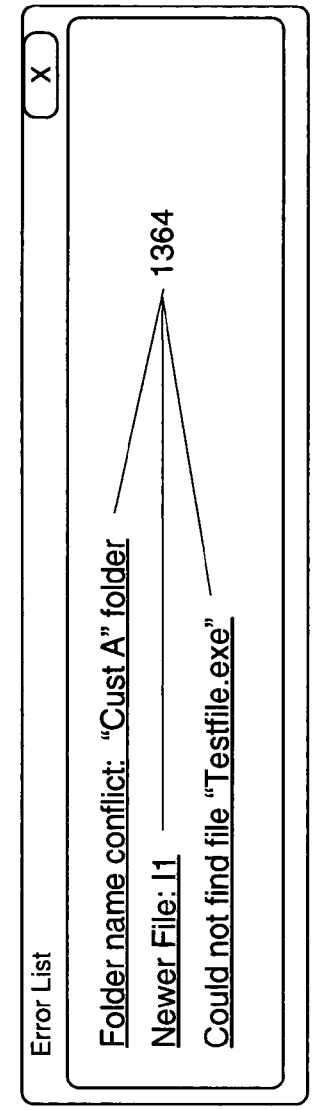

Dialog 1310 shown in FIG. 13A is generally the same as dialog 1110, except that it includes an error list button 1360 instead of a show error list option 1140. If the user selects error list button 1360, as shown in FIG. 13B, error list dialog 1362 is displayed, which is preferably displayed along with dialog 1310. As with error list 1250 of FIG. 12, error list dialog 1362 includes links 1364 that summarize errors identified during processing of the requested operation that were placed in error queue 211. If the user selects one of the links, an error dialog associated with the selected link is shown, such as one of the dialogs of FIGS. 6-9.

FIGS. 14A-23C illustrate various file operations that may be requested by a user via the user interface of FIG. 3 and potential results of these operations according to embodiments of the invention, which may result in errors being listed in error queue 211. It is understood that the illustrated operations may be a part of more complex file operations requested by a user or resulting from other actions (e.g., a new software installation, a periodic backup of files, software updates, a synchronization operation between two devices (e.g., a PDA and a laptop) etc. The illustrated file operations of these figures show various file and/or folder conflict scenarios, ways in which the operations engine 204 may handle the conflicts in various embodiments, and user interactions related to the same. It is understood that many more conflict scenarios may exist, as well as a variety of ways that the operations engine may handle the conflicts and interact with the user, in accordance with the invention.

FIG. 14A illustrates an operation 1410 in which there is a name conflict on an existing, but empty folder 1412. In this example, there is no harm if the existing empty folder 1412 at the destination is replaced by the incoming folder 1414 having the same name "F1." As such, operations engine 204 silently replaces existing folder 1412 with new folder 1414 without throwing an error, as illustrated in FIG. 14B.

Figure 15A:
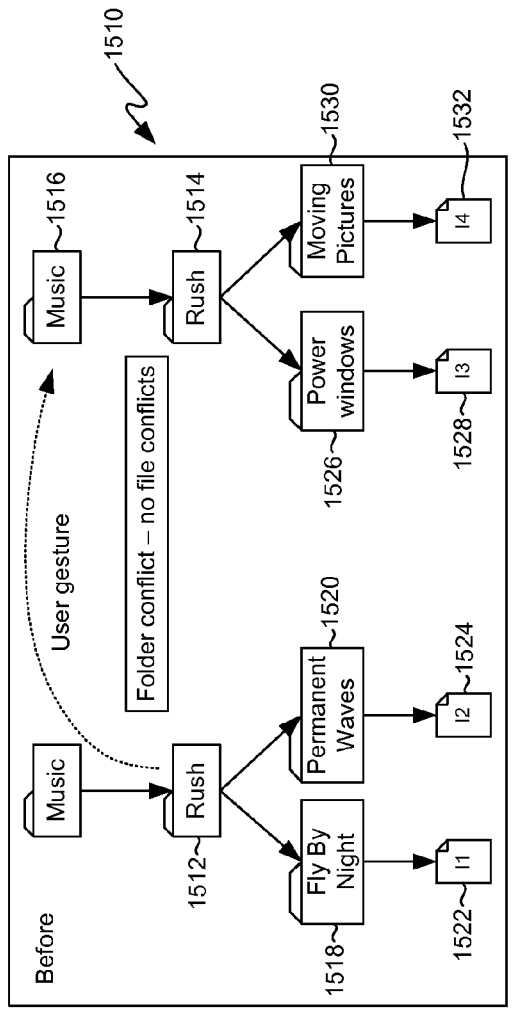
FIGS. 15A, 15B, and 15C illustrate an operation requested by a user via the user interface of FIG. 3 and a potential result of the operation according to an embodiment of the invention.
Figure 15B:
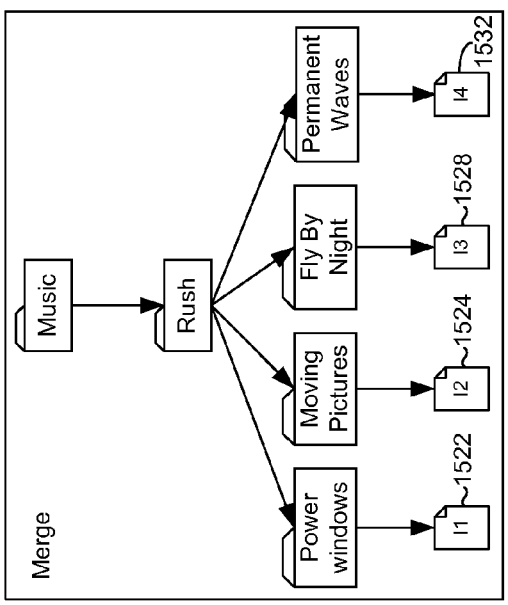
Figure 15C:
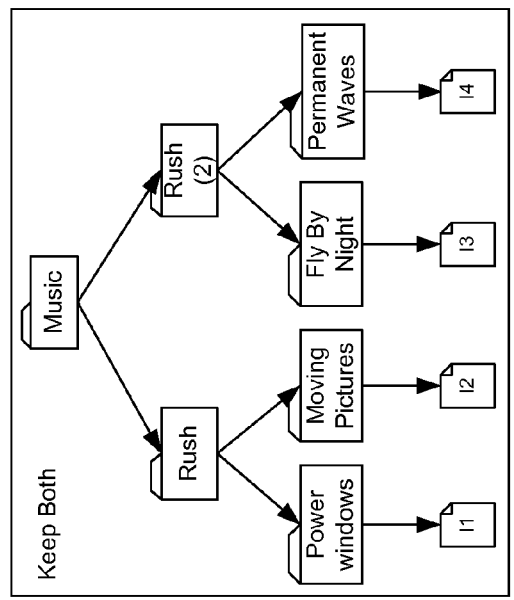

FIG. 15A illustrates an operation 1510 in which there is a name conflict on parent folders 1512, 1514 without subsequent file or folder conflicts. In the example operation 1510, folders 1512 and 1514 have the same name, and the requested operation is to move folder 1512 into the same parent folder 1516 in which folder 1514 is located. Folder 1512 includes folder 1518 with file 1520 and folder 1522 with file 1524. Similarly, folder 1514 includes folder 1526 with file 1528 and folder 1530 with file 1532. There are no name conflicts between folders 1518, 1520 and folders 1526, 1530, or between files 1522, 1524 and files 1528, 1532. As such, there is no chance for data loss from performing the requested operation. FIG. 15B illustrates one way in which the operations engine 204 may process the operation. As shown, operations engine 204 silently merges folders 1518 and 1520 with folders 1526 and 1530 that already exist within folder 1514. This type of scenario is seen frequently when users move music folders. As there are overlapping trees that are not in conflict, it is unnecessary to burden the user with an error dialog.

Figure 16A:
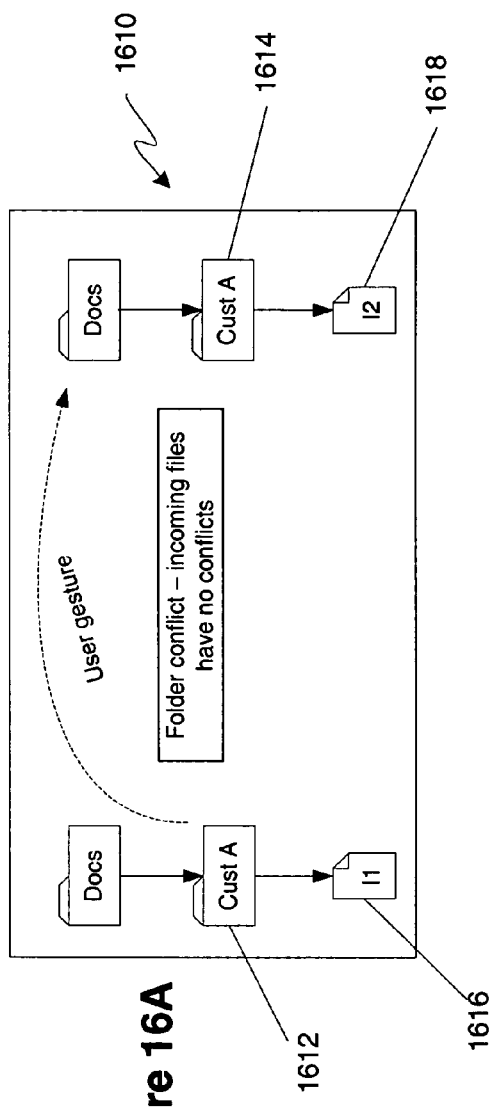
FIGS. 16A and 16B illustrate an operation requested by a user via the user interface of FIG. 3 and a result of the operation according to a further embodiment of the invention.
Figure 16B:
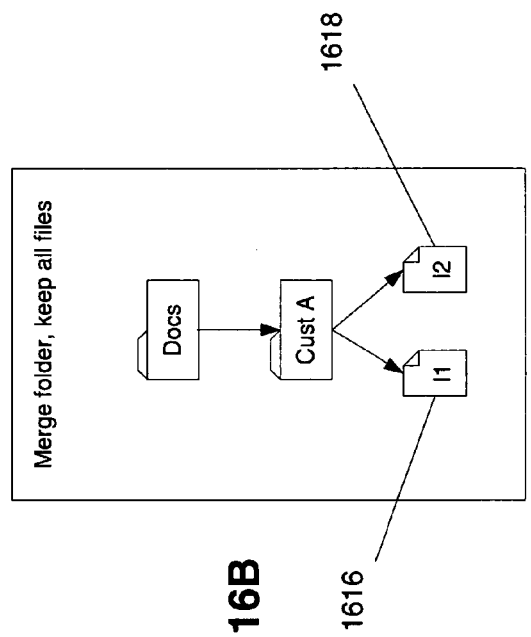

FIGS. 16A illustrates an operation 1610 in which there is a name conflict on parent folders 1612 and 1614 that each include one or more files that do not conflict. In the example operation 1610, folders 1612 and 1614 have the same name, and the requested operation is to move folder 1612 into the same parent folder 1616 in which folder 1614 is located. Folder 1612 includes file 1616 and folder 1614 includes file 1618. There are no name conflicts between files 1616 and 1618. As such, there is no chance for data loss from merging the contents of folders 1612 and 1614 according to the requested operation. FIG. 16B illustrates one way in which the operations engine 204 may process the operation by merging the folder contents. Thus, as shown, operations engine 204 silently merges file 1616 with file 1618 into folder 1614. This is a similar scenario to that of FIG. 15A. As with the operation shown in FIG. 16B, because there are overlapping trees that are not in conflict, it is unnecessary to burden the user with an error dialog.

Figure 17:
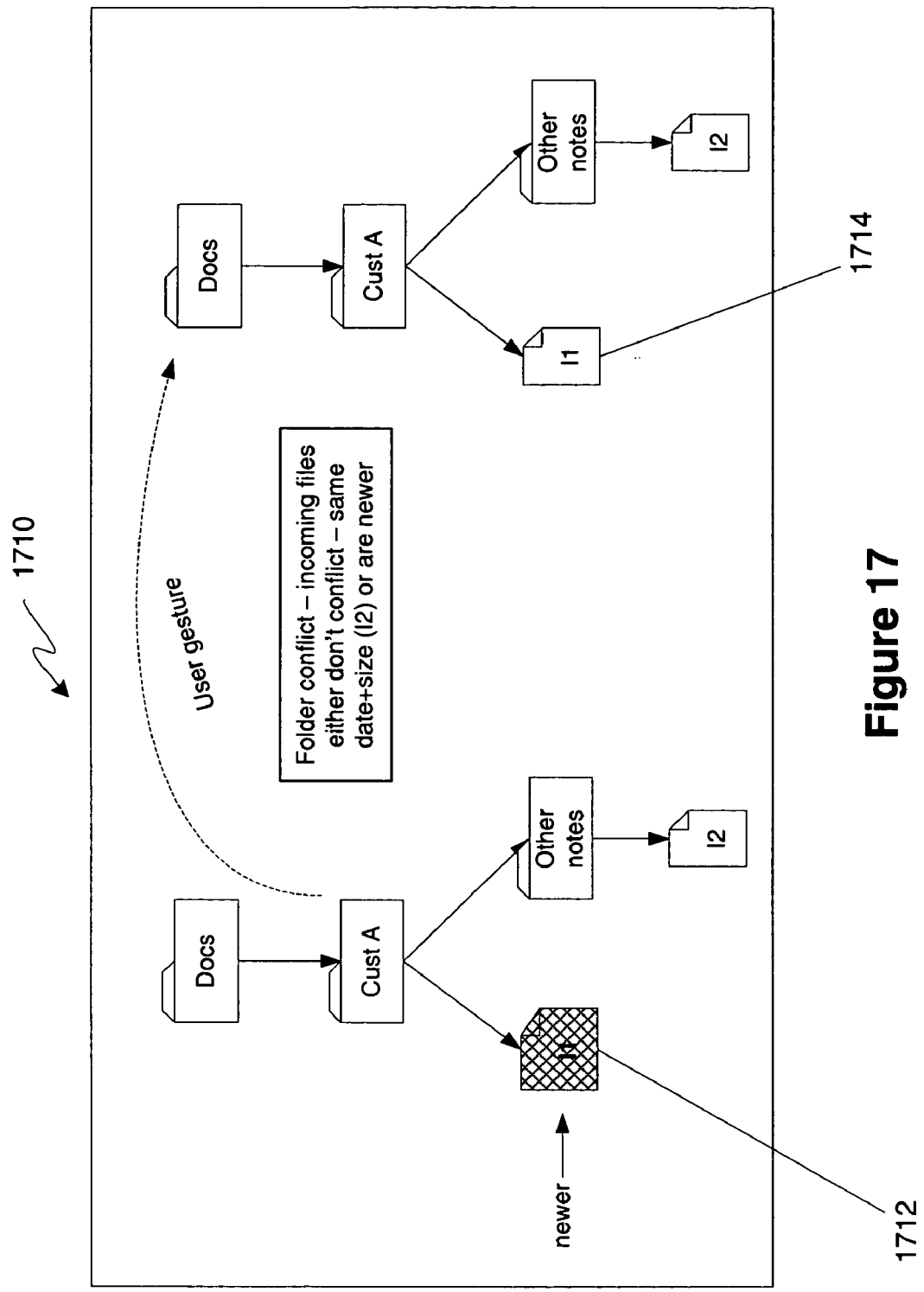
FIG. 17 illustrates an operation requested by a user via the user interface of FIG. 3 according to an embodiment of the invention.

FIG. 17 illustrates a file operation 1710 in which there is a conflict due to an incoming file 1712 being newer than an existing file 1714 of the same name located at the destination. In this general situation, which is represented here in a simple form, there are identical trees with one or more newer files 1712 being located in the incoming tree. This may occur when the user keeps the same general tree in two locations, such as at desktop computer and a mobile computer. This presents a situation in which data may be lost contrary to the user's desires. As such, operations engine 204 throws an error into the error queue 211 without performing the operation with respect to files 1712 and 1714, but may continue to perform other operations that are part of overall requested operation. Optionally, the error may not be thrown if the files are the exact same size and have the same date, but have different times. In that case, the operations engine automatically keeps either the older or the newer file based on the conclusion that they have the same content.

FIG. 18A shows an error dialog 1810 that is displayed based on the conflict of FIG. 17. As shown, the dialog includes a first command option 1812 to keep the newer file 1712, a second command option 1814 to keep the older file 1714, and a third option 1816 to keep both files 1712 and 1714. In addition, dialog 1810 includes the option 1818 to apply the selected command to similar errors encountered during the requested operation. Dialog 1810 may be shown to the user near the conclusion of a requested operation. It may also be shown when a user selects errors shown in error lists 1250 of FIG. 12 and 1362 of FIG. 13B.

FIGS. 18B-18D illustrate the result of the operation for command options 1812-1816.

FIG. 18B shows the result 1820 corresponding to user selection of option 1812 to keep newer file 1712. Similarly, FIG. 18C shows the result 1822 corresponding to user selection of option 1814 to keep older file 1814. FIG. 18C shows the result 1824 corresponding to user selection of option 1816 to keep both files. Thus, operations engine 204 renames one of the files, such as older file 1714, from I1 to I1(2) while retaining new file 1712 with its original name I1. Renamed filed 1714 could automatically be renamed with the addition of a counter, e.g., I1(2), with identifying language such as "copy (1) of I1," or other indicia to differentiate file 1712 from 1714. In another configuration (not shown), operations engine 204 could provide the user with an option in dialog 1810 to rename one of the files.

FIG. 19A illustrates an operation 1910 in which there is a conflict due to an incoming file 1912 being newer than an existing file 1914 of the same name located at the destination tree 1918, as well as a new file 1916 that does not exist in the destination tree. Operation 1910 and the potential results shown in FIGS. 19B-19D are generally the same as operation 1710 shown in FIG. 17 and the potential results shown in FIGS. 18B-18D, with the exception that one or more additional files would be moved to the destination tree 1918. As such, operations engine 204 may generally throw the same type of error into the error queue 211 as for operation 1710 and present a similar dialog as dialog 1810. The error dialog (not shown) may simply address the conflict for files 1912 and 1914, as there is no loss of data associated with adding new file 1916 to the destination tree 1918. As such, FIGS. 19B-

19D show new file 1916 in the destination tree regardless of the user selection for conflicting files 1912 and 1914.

FIG. 20A illustrates an operation 2010 in which there is a conflict due to an incoming file 2012 being older than an existing file 2014 of the same name located at the destination tree 2018, which is generally the opposite of the operation 1710 shown in FIG. 17. However, a similar user dialog to dialog 1810 may be shown to provide the user with options to keep the older file 2014, the newer file 2012, or both files. However, the dialog associated with operation 2010 preferably includes a strong warning that newer data may be lost as a result of the requested operation. The potential results shown in FIGS. 20B-20D generally correspond with the results shown in FIGS. 18B-18D depending on whether the user chooses to keep the older file, the new file or both files.

FIG. 21A illustrates an operation 2110 in which there is a conflict due to an incoming tree 2112 having a file 2116 that is older than a newer file 2118 in the destination tree 2114, and not including a file 2120 in the existing tree 2114. In this scenario, the user likely is trying to replace tree 2114 with a known good tree or to backup tree 2112, which may be a "restore from archive" type scenario. Merging the folders, but keeping just the older files, would not achieve the desired result (e.g., file 2118 would still be available). However, eliminating file 2118 would result in the loss of newer data that the user may not desire to lose. Thus, operations engine 205 throws an error and places it in the error queue 211. When the user views an associated dialog, options presented to the user may include replacing the older folder for Cust A 2120 with the source folder for Cust A 2122 along with its contents. As there may be multiple conflicts associated with such a "restoration" type scenario, the user may be presented with the option to see the individual file conflicts.

FIG. 22A illustrates an operation 2210 in which there is a mix of conflicts due to an older file 2212 and a newer file 2214 on incoming tree 2216 being selected for copying onto existing tree 2218. This scenario may occur as a result of the user trying to keep two trees synchronized, such as between a desktop computer and a laptop computer, in which both trees have been modified. A dialog (not shown) associated with this scenario may include a clear warning that a mix of older and newer files are about to be overwrited. The dialog may ask the user if he wants to do this. Preferably, the dialog will identify the number of conflicting files, such as, "There are 1 newer files, 1 older files, and 1 unchanged. What do you want to do?" FIG. 22B shows the result of a user choice to keep all newer files, and FIG. 22C illustrates the result of a user choice to keep all files from the source tree 2216. Other permutations exist in various combinations, which may result from a user selection to see individual file conflicts and make decisions for each conflict.

Figure 23A:
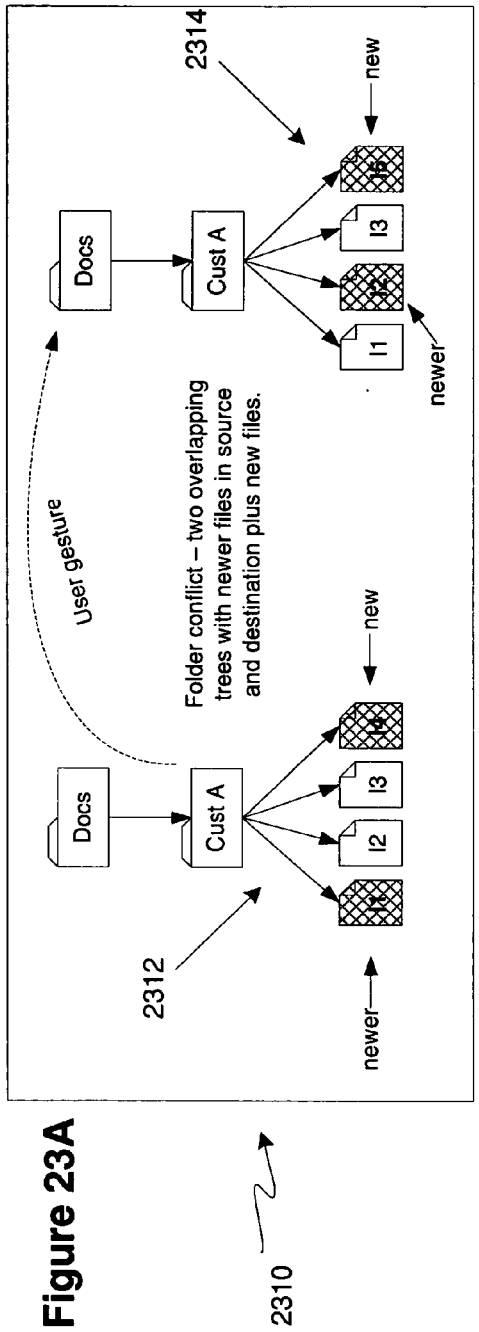
FIGS. 23A, 23B and 23C illustrate an operation requested by a user via the user interface of FIG. 3 and potential results of the operation according to embodiments of the invention.
Figure 23C:
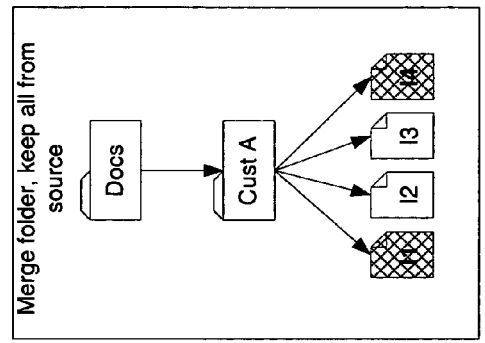
Figure 23B:
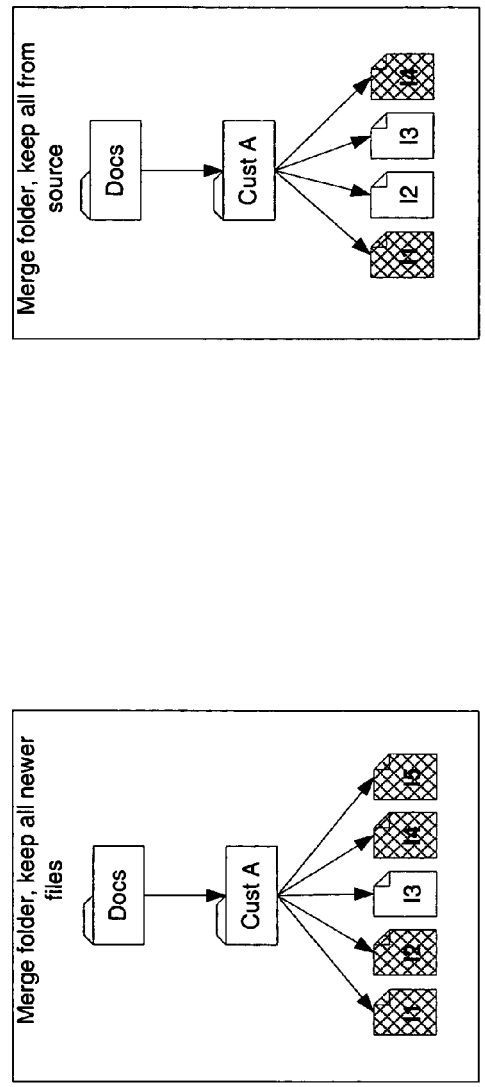

FIG. 23A illustrates an operation 2310 in which there is a larger mix of conflicts than operation 2210, as both the tree 2312 being transferred and the destination tree 2314 include newer files than what exist in the other tree. As with operation 2210, this scenario may occur as a result of the user trying to keep two trees synchronized, such as between a desktop computer and a laptop computer, in which both trees have been modified. When selected from the error queue, the operations engine 204 may handle this error similar to operation 2210 by presenting a dialog (not shown) that includes a clear warning that a mix of older and newer files are about to be overwritten. The dialog may ask the user if he wants to do this. Preferably, the dialog will identify the number of conflicting files, such as, "There are 2 newer files, 2 older files, and 0 unchanged. What do you want to do?" FIG. 23B shows the result of a user choice to keep all newer files, and FIG. 23C illustrates the result of a user choice to keep all files from the source tree 2314. Other permutations exist in various combinations, which may result from a user selection to see individual file conflicts and make decisions for each conflict.

FIGS. 14A-23C illustrate various types of errors that may be thrown to an error queue, presented to the user in a dialog, and/or silently handled, depending the type of error and the desired configuration of operations engine 204. Although these examples are relatively simple examples, they illustrate types of errors that may be identified in an error queue and handled at a later point in the requested operation. Thus, the requested operation may proceed and may often be largely completed despite an error being encountered, rather than the process being interrupted when the error is encountered.

Figure 24:
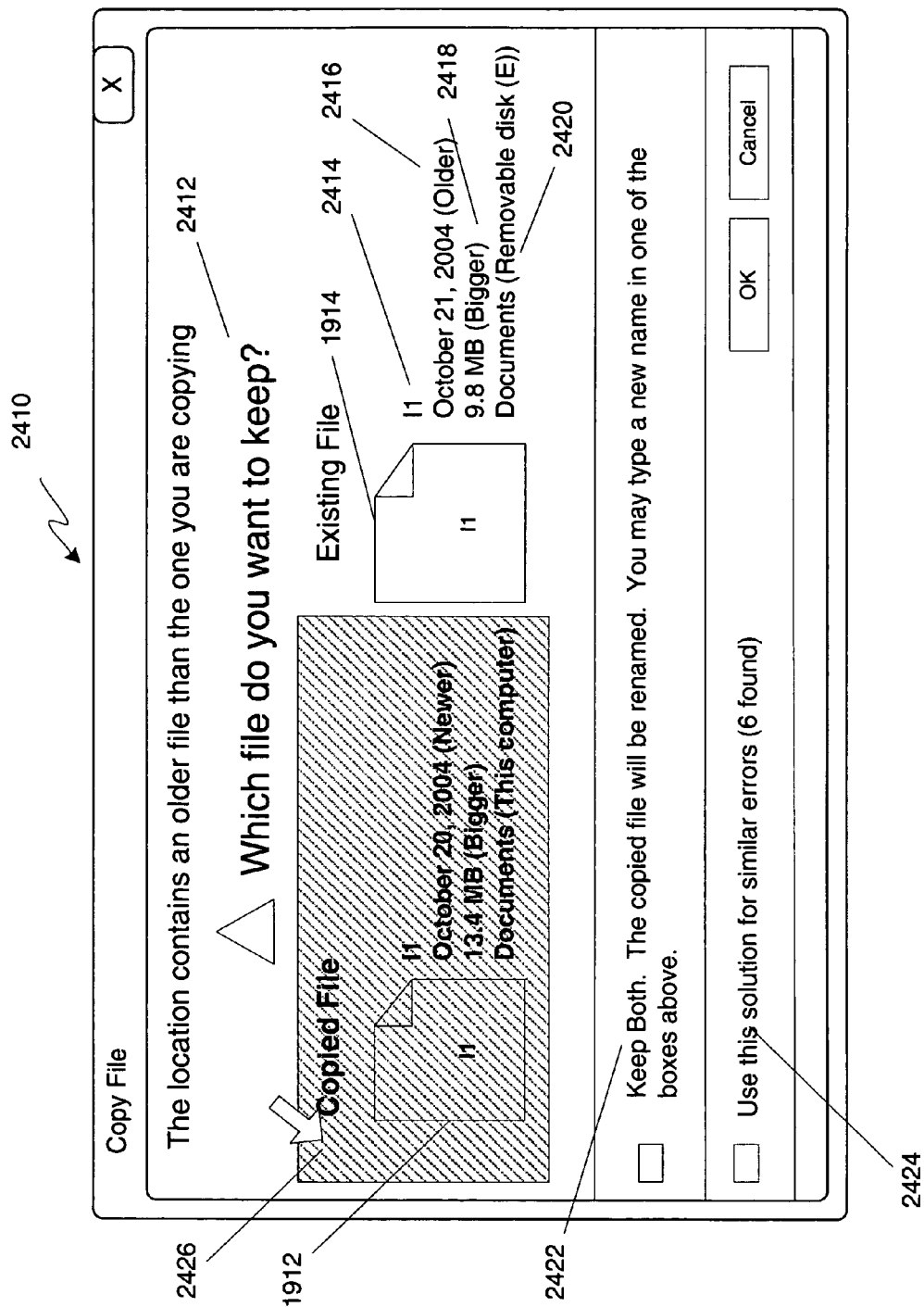
FIG. 24 shows a dialog according to an embodiment of the invention, which is shown on the user interface display of FIG. 3 in response to the operation request of FIG. 19A.

FIG. 24 shows an error dialog 2410 that is displayed based on requested operation 1910 shown in FIG. 19A, in which the requested operation involves copying newer file 1912 to tree 1918 where an older file of the same name 1914 resides. As shown, the dialog includes a warning 2412 that the location includes an older file than the one the user is copying along with the question, "Which file do you want to keep?" The user may select one of the files to keep by simply clicking on the file or otherwise indicating their selection. As shown, the dialog may highlight 2426 or otherwise show the user's selection. The dialog also includes, for each file 1912 and 1914, the filename 2414, the date of the file 2416, its size 2418, its current storage location 2420, or other information that may assist the user with recognizing the files involved.

In addition dialog 2410 includes an option 2422 to keep both the newer file 1912 and the older file 1914. It further includes the option 2424 to apply the user's choice to similar errors found in the requested operation. As such, if the user chooses to keep the newer file and applies option 2424, then all newer files would be kept for the similar conflicts. Similarly, if the user chooses to keep the older file and applies option 2424, then all older files would be kept for similar conflicts. The same applies if the user chooses to keep both files.

If the user chooses the keep both files, then operations engine 204 may automatically rename one of the files to include additional information, such as an integer added to a root of the filename. In one embodiment, the lowest available integer for the particular filename at the destination may be added to the incoming file. For instance, file 1912 would be changed from "I1" to "I1(1)." If a file named "I1(1)" already existed in tree 1918, then it would be renamed "I1(2)." In an alternative embodiment, the newer file could always be the file that is renamed. In other embodiments, the user could select preferences for which file should automatically be renamed, such as with an integer or with other characters. The renamed file may be renamed in a variety of ways, such as from "I1" to "copy of I1" or "copy 2 of I1." However, adding an integer is preferable for its simplicity and ease of understanding for the user.

Figure 25:
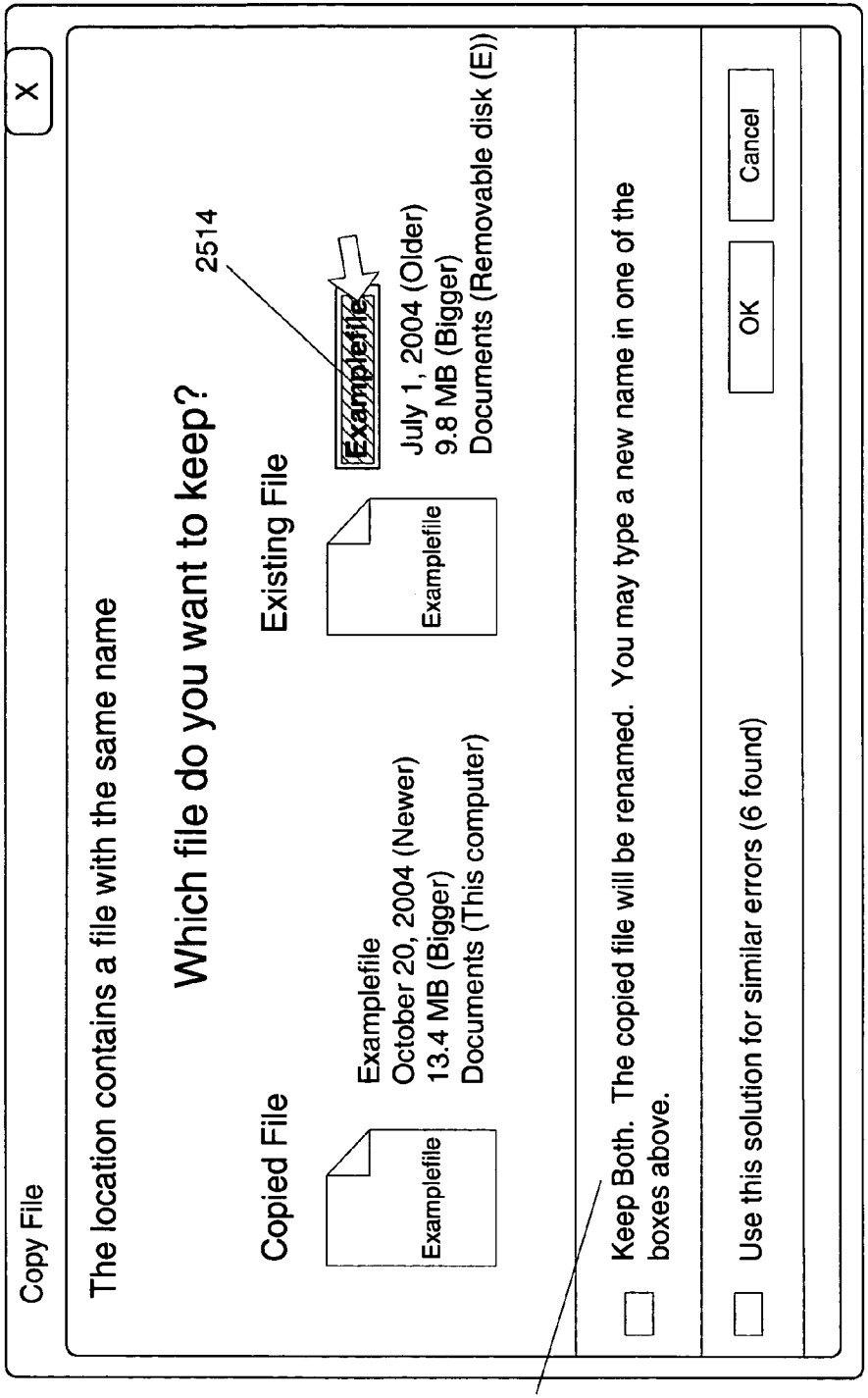
FIG. 25 shows a dialog according to another embodiment of the invention, which is shown on the user interface display of FIG. 3 in response to an operation request having a file name conflict.

FIG. 25 shows an error dialog 2510 that is similar to error dialog 2410, except that the user is permitted to change one of the conflicting file names. As shown, the user may click or otherwise select a filename to change, which the dialog will indicate 2514 by highlighting it or otherwise emphasizing it to the user. In the example shown, dialog 2510 permits the user to click on the filename once, which places it in a rename mode in which the user can enter a new name for the file. If the user renames one of the files, then operations engine 204 will automatically keep both files without requiring the user to select the Keep Both option 2512. In another embodiment, if the user selects Keep Both option 2512, then both filenames will be highlighted in a rename mode with one of the files (e.g., the one being copied into the destination) having the default name (e.g., Examplefile(1)). The user could then choose to modify either filename, or to simply click "OK" to accept the proposed names.

Figure 26:
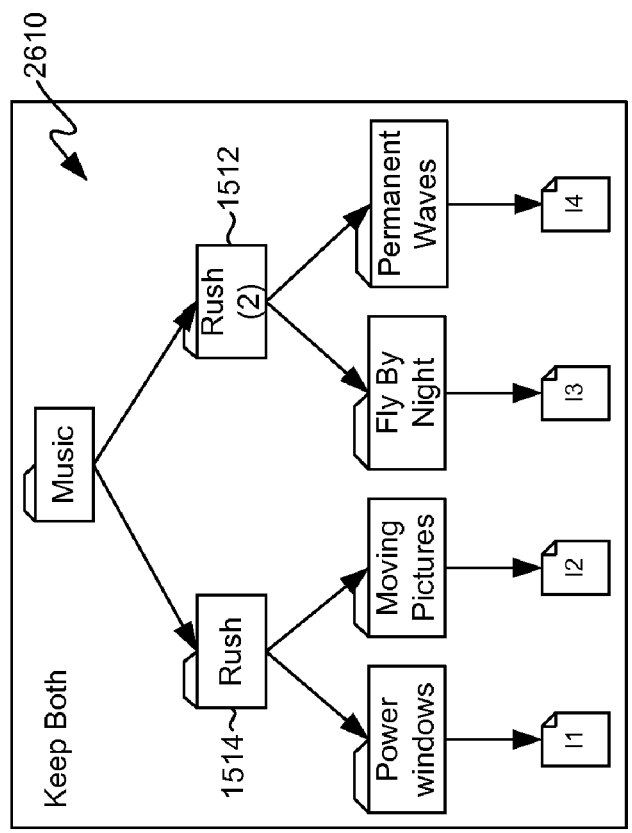
FIG. 26 illustrates a potential result of the operation of FIG. 15A according to an embodiment of the invention.

FIG. 26, which is shown along with a copy of FIG. 15A, illustrates an alternative way from the "merge" option shown in FIG. 15B in which the operations engine 204 may process the operation requested in FIG. 15A. As shown in FIG. 15A, the requested operation includes a folder conflict without any filename conflicts. Folder 1512 named "Rush" is being moved into music folder 1516, which already includes a folder named "Rush." However, none of the folders or files within either folder conflicts with another folder or file. As such, operations engine 204 silently keeps both files 1512 and 1514 without prompting the user. It may do so by renaming one of the conflicting folders, such as newer folder 1512, to include the lowest available integer appended to its name. In another embodiment, a dialog similar to dialogs 2410 and 2510 may be shown to the user, which permits the user to choose to keep both, rename one, or discard a folder.

Figure 27:
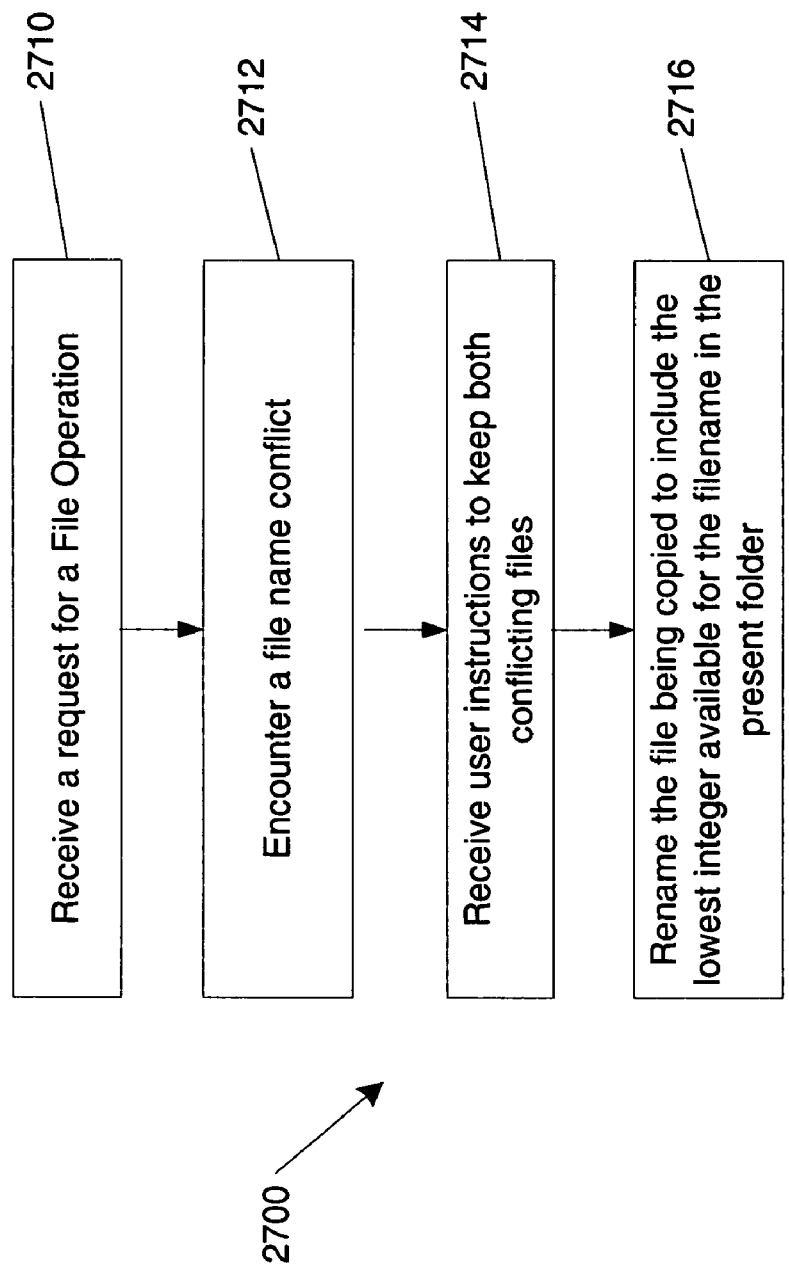
FIG. 27 is a flow diagram illustrating a method for processing file conflicts according to embodiments of the invention.

FIG. 27 illustrates a method 2700 for processing file conflicts by the operations engine 204, such as file name conflicts. Although described in the context of operations engine 204, it is understood that this method may be included with various operations engines, such as conventional operations engines. Thus, method 2700 may be practiced with or without features such as pre-calculation of errors, error queuing or other features described along with embodiments of operations engine 204. However, for operations engines with such functionality, file name conflicts are preferably identified along with the step of pre-calculation of potential errors 512 shown in FIG. 5, and/or are placed in the error queue 211 during processing of a requested operation.

As shown, method 2700 includes the step 2710 of receiving a request for a file operation and the step 2712 of encountering a file name conflict associated with the request. The file name conflict may be identified during processing of the operation or at an earlier time, such as during pre-calculation of potential errors. The method further includes the step 2714 of receiving user instructions to keep both conflicting files. This may occur in response to identification of the conflict during pre-calculation, while the operation is being processed, or as the user reviews errors in error queue 211. If the user does not rename one of the files, the operations engine may perform the step 2716 of renaming one of the files, such as the incoming file, to include the lowest integer available for the conflicting filename. In an alternative embodiment, the user may establish preferences for all file name conflicts, such as to always rename the file being copied to include the lowest available integer for the root filename.

Aspects of the present invention have been described in terms of illustrative embodiments thereof. Numerous other embodiments, modifications and variations within the scope and spirit of the appended claims will occur to persons of ordinary skill in the art from a review of this disclosure. In particular, it is understood that aspects of the invention may practiced with a large variety of computing devices, including personal computers, mobile devices, PDAs, and mobile terminals.

What is claimed is:

1. A computer-readable medium having computer-executable instructions for performing steps comprising:
   receiving a request at an operations engine of a computer operating system to perform a file transfer operation corresponding to a transfer of a plurality of files from a source to a destination;
   prior to transferring any of the files from the source to the destination, determining for each of the plurality of files if a file transfer error will result from transferring the file from the source to the destination;
   identifying a file transfer error that will result from transferring at least one of the plurality of files from the source to the destination; and
   providing a user with an option to configure the file transfer operation to address the identified file transfer error.

2. The computer-readable medium of claim 1, wherein the identified file transfer error corresponds to a filename conflict between a first file in the plurality of files and a second file with the same filename at the destination, and wherein providing the user with an option to configure the file transfer operation includes permitting the user to keep both the first and the second file by permitting the user to change a filename for one of the first file and the second file.

3. The computer-readable medium of claim 2, wherein the filename conflict is placed in an error queue while the operations engine processes the file transfer operation.

4. The computer-readable medium of claim 2, wherein the steps further comprise:
   automatically renaming the filename for one of the first file and the second file to append a character to the filename.

5. The computer-readable medium of claim 4, wherein automatically renaming the filename includes identifying a lowest integer not being used in portion of a filename at the destination.

6. The computer-readable medium of claim 1, wherein the step of providing the user with an option to configure the file transfer operation includes permitting the user to apply a selected configuration choice to similar file transfer errors identified during the file transfer operation.

7. The computer-readable medium of claim 1, wherein the file transfer operation comprises one of copying a plurality of files and moving a plurality of files from a source to a destination.

8. The computer-readable medium of claim 1, wherein the identified file transfer error corresponds to a determination that there is insufficient space at the destination to transfer one or more of the plurality of files from the source to the destination.

9. The computer-readable medium of claim 1, wherein the identified file transfer error corresponds to a determination that a user permission is required to transfer one or more of the plurality of files from the source to the destination.

10. The computer-readable medium of claim 1, wherein the file transfer operation comprises removing a plurality of files from a source directory, wherein the identified file transfer error corresponds to a determination that at least one system file or executable file will be removed during the file transfer operation, and wherein providing the user with an option to configure the file transfer operation comprises providing a warning of the consequences of removing the at least one system file or executable file.

11. A computer-readable medium having computer-executable instructions for performing steps comprising:
   receiving a request at an operations engine of a computer operating system to perform a file operation, the file operation including one of copying a plurality of folders and moving the plurality of folders to a destination;
   prior to copying or moving any of the plurality of folders to the destination, determining for each of the plurality of folders if a file transfer error will result from copying or moving any of the plurality of folders to the destination;
   prior to copying or moving any of the plurality of folders to the destination, encountering a folder name conflict between a first folder in the plurality of folders and a second folder at the destination;

prior to copying or moving any of the plurality of folders to the destination, automatically renaming at least one of the folders to append a character to its folder name; and after reconciling the folder name conflict, copying or moving the plurality of folders to the destination.

12. The computer-readable medium of claim 11, wherein automatically renaming one of the folders includes identifying a lowest integer not being used in a portion of a folder name at the destination.

13. A method of performing file operations on a computer, the method comprising:

receiving a request at an operations engine of a computer operating system of the computer to perform a file transfer operation corresponding to a transfer of a plurality of files from a source to a destination, wherein the file transfer operation comprises one of copying a plurality of files and moving a plurality of files from a source to a destination;

prior to transferring any of the files from the source to the destination, determining for each of the plurality of files if a file transfer error will result from transferring the file from the source to the destination;

identifying a file transfer error that will result from transferring at least one of the plurality of files from the source to the destination;

when the file transfer error corresponds to a determination that at least one of a system file and an executable file will be removed from the source by the file transfer operation, providing a warning of a consequence of removing the at least one of a system file and an executable file from the source;

providing the user with an option to configure the file transfer operation to address the identified file transfer error; and proceeding with the file transfer operation to an extent possible without waiting for a user input in response to providing the user with the option to configure the file transfer operation; and when no user input in response to providing the user with the option to configure the file transfer operation is received prior to completing the file transfer operation to the extent possible, determining if the file transfer operation for the at least one of the plurality of files for which a file transfer error was identified will still result in a file transfer error;

when it is determined that the file transfer operation for the at least one of the plurality of files for which a file transfer error was identified will no longer result in a file transfer error, proceeding with the file transfer operation for the at least one of the plurality of files.

14. The method of claim 13, wherein the identified file transfer error corresponds to a filename conflict between a first file in the plurality of files and a second file with the same filename at the destination, and wherein providing the user with an option to configure the file transfer operation includes permitting the user to keep both the first and the second file by permitting the user to change a filename for one of the first file and the second file.

15. The method of claim 14, wherein the filename conflict is placed in an error queue while the operations engine processes the file transfer operation.

16. The method of claim 14, further comprising:

automatically renaming the filename for one of the first file and the second file to append a character to the filename.

17. The method of claim 16, wherein automatically renaming the filename includes identifying a lowest integer not being used in a portion of a filename at the destination.

18. The method of claim 13, wherein the identified file transfer error corresponds to a determination that there is insufficient space at the destination to transfer one or more of the plurality of files from the source to the destination.

19. The method of claim 13, wherein the identified file transfer error corresponds to a determination that a user permission is required to transfer one or more of the plurality of files from the source to the destination.

* * * * *